US008669972B2

(12) United States Patent
Shirai

(10) Patent No.: US 8,669,972 B2
(45) **Date of Patent: *Mar. 11, 2014**

(54) LIQUID CRYSTAL DISPLAY PANEL DRIVING METHOD, LIQUID CRYSTAL DISPLAY DEVICE, AND LIQUID CRYSTAL DISPLAY DRIVER INCLUDING DRIVING AND SETTING A COUNTER ELECTRODE FOR COMMON INVERSION DRIVING

(75) Inventor: Hiroaki Shirai, Kanagawa (JP)

(73) Assignee: Renesas Electronics Corporation, Kawasaki-Shi, Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/618,281

(22) Filed: Sep. 14, 2012

(65) Prior Publication Data

US 2013/0009928 A1 Jan. 10, 2013

Related U.S. Application Data

(63) Continuation of application No. 12/289,587, filed on Oct. 30, 2008, now Pat. No. 8,294,652.

(30) Foreign Application Priority Data

Oct. 31, 2007 (JP) ................................ 2007-283116

(51) Int. Cl.

| | |
|---|---|
| ***G06F 3/038*** | (2013.01) |
| ***G09G 5/00*** | (2006.01) |
| ***G09G 3/12*** | (2006.01) |
| ***G09G 3/18*** | (2006.01) |
| ***G09G 3/10*** | (2006.01) |
| ***G09G 3/28*** | (2013.01) |
| ***G09G 3/30*** | (2006.01) |
| ***G09G 3/36*** | (2006.01) |

(52) U.S. Cl.

USPC ................ 345/209; 345/36; 345/38; 345/42; 345/50; 345/53; 345/54; 345/68; 345/69; 345/79; 345/87; 345/88; 345/89; 345/90; 345/92; 345/94; 345/95; 345/96; 345/97; 345/99; 345/204; 345/210; 345/211; 345/212; 345/214

(58) Field of Classification Search

USPC ........................................................ 345/209

See application file for complete search history.

(56) References Cited

U.S. PATENT DOCUMENTS 6,181,313 B1 1/2001 Yokota et al.
7,786,970 B2 8/2010 Gotou (Continued)

FOREIGN PATENT DOCUMENTS

JP 09-258175 A 10/1997
JP 2003-302951 A 10/2003

(Continued)

OTHER PUBLICATIONS

Japanese Office Action dated Apr. 26, 2012, with partial English-language translation.

*Primary Examiner* — Alexander S Beck
*Assistant Examiner* — K. Kiyabu
(74) *Attorney, Agent, or Firm* — McGinn Intellectual Property Law Group, PLLC

(57) ABSTRACT

A driving method of a liquid crystal display panel having a source line and a counter electrode, includes driving the counter electrode to a first potential, driving the, counter electrode to a second potential being different from the first potential, setting the counter electrode and the source line to a third potential by short-circuiting the counter electrode and the source line to an interconnection having a potential between the first potential and the second potential, and driving the source line to a potential corresponding to an image data. The setting of the counter electrode and the source line to the third potential occurs in a period of one frame.

20 Claims, 38 Drawing Sheets

(56) References Cited

U.S. PATENT DOCUMENTS

2003/0080934 A1 5/2003 Ishiyama
2003/0151572 A1 8/2003 Kumada et al.
2006/0103618 A1 5/2006 Miura
2006/0267902 A1 11/2006 Akiyama et al.
2008/0062027 A1* 3/2008 Chung .......................... 341/155
2009/0009446 A1* 1/2009 Kamijo et al. .................. 345/87

FOREIGN PATENT DOCUMENTS

JP 2005-134910 A 5/2005
JP 2007-101570 4/2007

* cited by examiner

Fig. 4

| COLOR | ITEM | PERIOD T1 | PERIOD T2 | PERIODT3 | PERIOD T4 | PERIOD T5 | TOTAL |
|---|---|---|---|---|---|---|---|
| WHITE | VCOM POTENTIAL | -1.0[V] | 0[V] | 0.25[V] | 4.0[V] | | 1.0[V] *C |
| | VCOM CHARGE CONSUMPTION | 0 | 0 | 0 | 0 | | |
| | SOURCE POTENTIAL | 0.5[V] | 0.5[V] | 0.25[V] | 4.5[V] | | |
| | SOURCE CHARGE CONSUMPTION | 0 | 0 | 0 | 0.5[V]*C (DOUBLE) | | |
| | TOTAL CHARGE CONSUMPTION (CONVERTED BY VCI) | 0 | 0 | 0 | 1.0[V]*C | | |
| GRAY | VCOM POTENTIAL | -1.0[V] | 0[V] | 1.25[V] | 4.0[V] | | 3.0[V] *C |
| | VCOM CHARGE CONSUMPTION | 0 | 0 | 0 | 1.5[V]*C (DOUBLE) | | |
| | SOURCE POTENTIAL | 2.5[V] | 2.5[V] | 1.25[V] | 2.5[V] | | |
| | SOURCE CHARGE CONSUMPTION | 0 | 0 | 0 | 0 | | |
| | TOTAL CHARGE CONSUMPTION (CONVERTED BY VCI) | 0 | 0 | 0 | 3.0[V]*C | | |
| BLACK | VCOM POTENTIAL | -1.0[V] | 0[V] | 2.25[V] | 4.0[V] | | 7.0[V] *C |
| | VCOM CHARGE CONSUMPTION | 0 | 0 | 0 | 3.5[V]*C (DOUBLE) | | |
| | SOURCE POTENTIAL | 4.5[V] | 4.5[V] | 2.25[V] | 0.5[V] | | |
| | SOURCE CHARGE CONSUMPTION | 0 | 0 | 0 | 0 | | |
| | TOTAL CHARGE CONSUMPTION (CONVERTED BY VCI) | 0 | 0 | 0 | 7.0[V]*C | | |

TOTAL 11.0[V]*C

Fig. 5

| COLOR | ITEM | PERIOD T1 | PERIOD T2 | PERIODT3 | PERIOD T4 | PERIOD T5 | TOTAL |
|---|---|---|---|---|---|---|---|
| WHITE | VCOM POTENTIAL | 4.0[V] | 4.25[V] | -1.0[V] | | | 4.5[V]*C |
| | VCOM CHARGE CONSUMPTION | 0 | 0 | 1.5[V]*C | | | |
| | SOURCE POTENTIAL | 4.5[V] | 4.25[V] | 0.5[V] | | | |
| | SOURCE CHARGE CONSUMPTION | 0 | 0 | 1.5[V]*C (DOUBLE) | | | |
| | TOTAL CHARGE CONSUMPTION (CONVERTED BY VCI) | 0 | 0 | 4.5[V]*C | | | |
| GRAY | VCOM POTENTIAL | 4.0[V] | 3.25[V] | -1.0[V] | | | 10.5[V]*C |
| | VCOM CHARGE CONSUMPTION | 0 | 0 | 3.5[V]*C | | | |
| | SOURCE POTENTIAL | 2.5[V] | 3.25[V] | 2.5[V] | | | |
| | SOURCE CHARGE CONSUMPTION | 0 | 0 | 3.5[V]*C (DOUBLE) | | | |
| | TOTAL CHARGE CONSUMPTION (CONVERTED BY VCI) | 0 | 0 | 10.5[V]*C | | | |
| BLACK | VCOM POTENTIAL | 4.0[V] | 2.25[V] | 1.0[V] | | | 16.5[V]*C |
| | VCOM CHARGE CONSUMPTION | 0 | 0 | 5.5[V]*C | | | |
| | SOURCE POTENTIAL | 0.5[V] | 2.25[V] | 4.5[V] | | | |
| | SOURCE CHARGE CONSUMPTION | 0 | 0 | 5.5[V]*C (DOUBLE) | | | |
| | TOTAL CHARGE CONSUMPTION (CONVERTED BY VCI) | 0 | 0 | 16.5[V]*C | | | |

TOTAL 31.5[V]*C

Fig. 8B

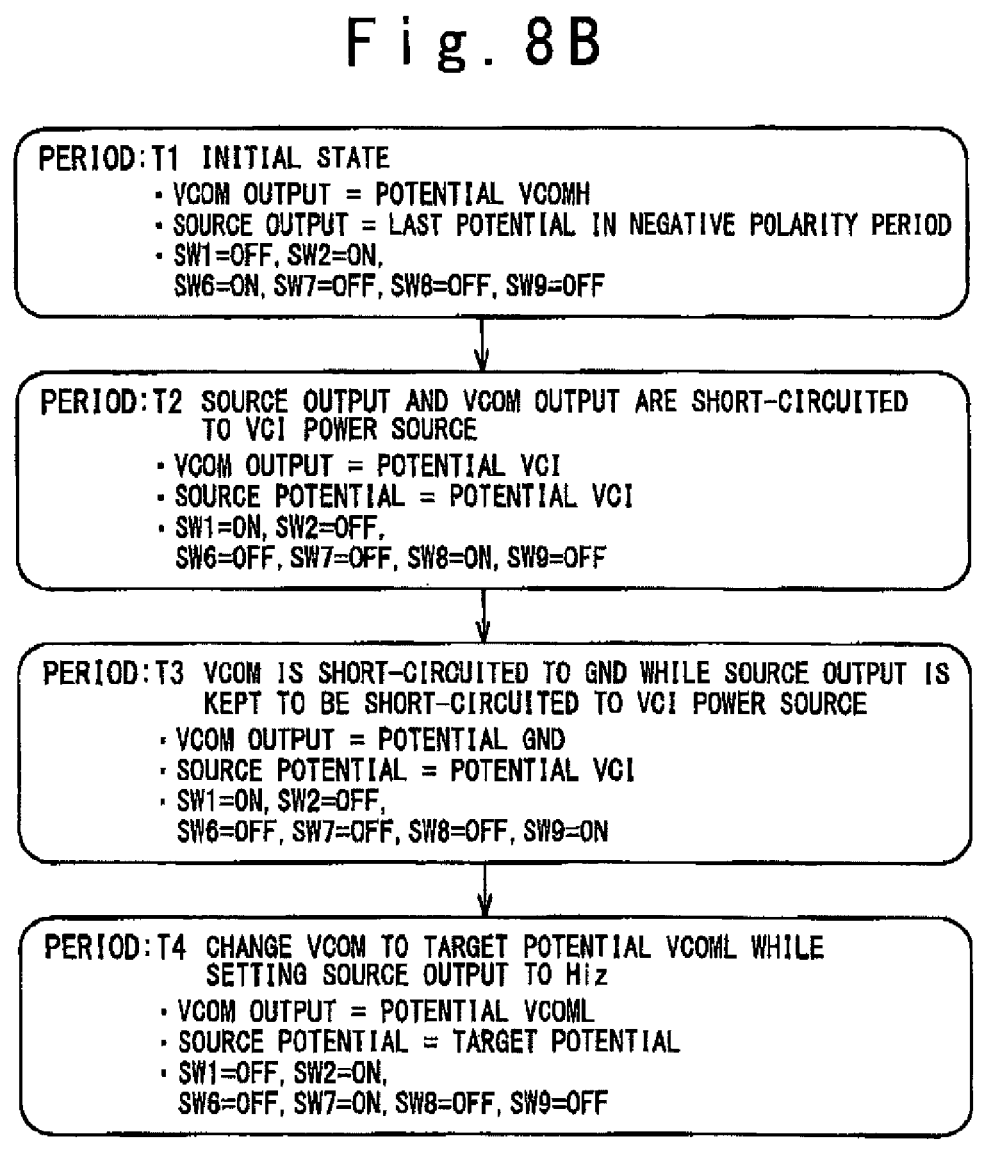

PERIOD: T1 INITIAL STATE
- VCOM OUTPUT = POTENTIAL VCOMH
- SOURCE OUTPUT = LAST POTENTIAL IN NEGATIVE POLARITY PERIOD
- SW1=OFF, SW2=ON,
  SW6=ON, SW7=OFF, SW8=OFF, SW9=OFF

↓

PERIOD: T2 SOURCE OUTPUT AND VCOM OUTPUT ARE SHORT-CIRCUITED TO VCI POWER SOURCE
- VCOM OUTPUT = POTENTIAL VCI
- SOURCE POTENTIAL = POTENTIAL VCI
- SW1=ON, SW2=OFF,
  SW6=OFF, SW7=OFF, SW8=ON, SW9=OFF

↓

PERIOD: T3 VCOM IS SHORT-CIRCUITED TO GND WHILE SOURCE OUTPUT IS KEPT TO BE SHORT-CIRCUITED TO VCI POWER SOURCE
- VCOM OUTPUT = POTENTIAL GND
- SOURCE POTENTIAL = POTENTIAL VCI
- SW1=ON, SW2=OFF,
  SW6=OFF, SW7=OFF, SW8=OFF, SW9=ON

↓

PERIOD: T4 CHANGE VCOM TO TARGET POTENTIAL VCOML WHILE SETTING SOURCE OUTPUT TO Hiz
- VCOM OUTPUT = POTENTIAL VCOML
- SOURCE POTENTIAL = TARGET POTENTIAL
- SW1=OFF, SW2=ON,
  SW6=OFF, SW7=ON, SW8=OFF, SW9=OFF

Fig. 14

| COLOR | ITEM | PERIOD T1 | PERIOD T2 | PERIODT3 | PERIOD T4 | PERIOD T5 | TOTAL |
|---|---|---|---|---|---|---|---|
| WHITE | VCOM POTENTIAL | 4.0[V] | 2.8[V] | 0[V] | -1.0[V] | -1.0[V] | 4.1[V]*C |
| | VCOM CHARGE CONSUMPTION | 0 | 0 | 0 | 0 | 1.3[V]*C | |
| | SOURCE POTENTIAL | 4.5[V] | 2.8[V] | 2.8[V] | 1.8[V] | 0.5[V] | |
| | SOURCE CHARGE CONSUMPTION | 0 | 0 | 2.8[V]*C | 0 | 0 | |
| | TOTAL CHARGE CONSUMPTION (CONVERTED BY VCI) | 0 | 0 | 2.8[V]*C | 0 | 1.3[V]*C | |
| GRAY | VCOM POTENTIAL | 4.0[V] | 2.8[V] | 0[V] | -1.0[V] | -1.0[V] | 4.9[V]*C |
| | VCOM CHARGE CONSUMPTION | 0 | 0 | 0 | 0 | 0.7[V]*C | |
| | SOURCE POTENTIAL | 2.5[V] | 2.8[V] | 2.8[V] | 1.8[V] | 2.5[V] | |
| | SOURCE CHARGE CONSUMPTION | 0 | 0 | 2.8[V]*C | 0 | 0.7[V]*C (DOUBLE) | |
| | TOTAL CHARGE CONSUMPTION (CONVERTED BY VCI) | 0 | 0 | 2.8[V]*C | 0 | 2.1[V]*C | |
| BLACK | VCOM POTENTIAL | 4.0[V] | 2.8[V] | 0[V] | -1.0[V] | -1.0[V] | 10.9[V]*C |
| | VCOM CHARGE CONSUMPTION | 0 | 0 | 0 | 0 | 2.7[V]*C | |
| | SOURCE POTENTIAL | 0.5[V] | 2.8[V] | 2.8[V] | 1.8[V] | 4.5[V] | |
| | SOURCE CHARGE CONSUMPTION | 0 | 0 | 2.8[V]*C | 0 | 2.7[V]*C (DOUBLE) | |
| | TOTAL CHARGE CONSUMPTION (CONVERTED BY VCI) | 0 | 0 | 2.8[V]*C | 0 | 8.1[V]*C | |

TOTAL 19.9[V]*C

Fig. 16

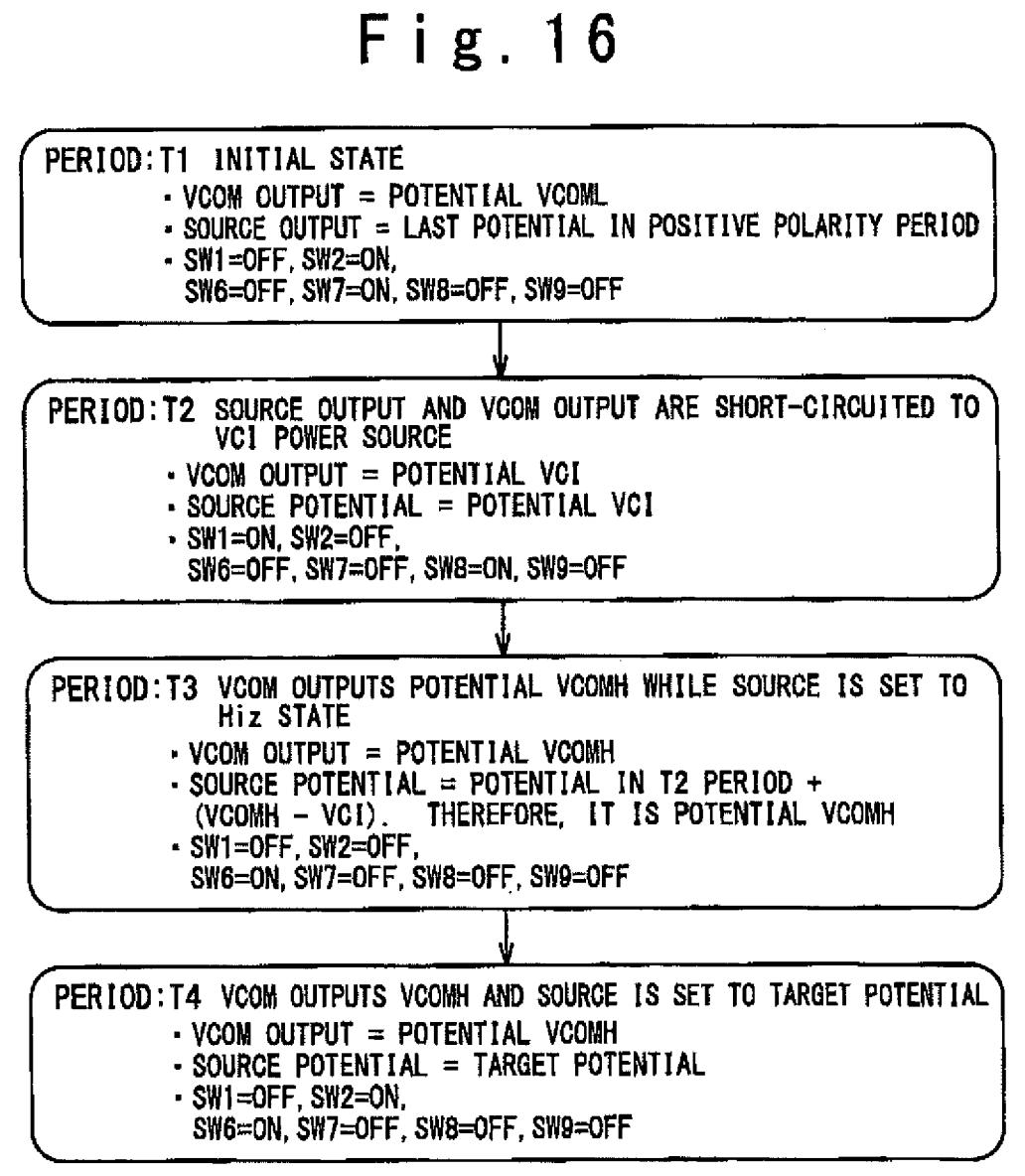

PERIOD:T1 INITIAL STATE
- VCOM OUTPUT = POTENTIAL VCOML
- SOURCE OUTPUT = LAST POTENTIAL IN POSITIVE POLARITY PERIOD
- SW1=OFF, SW2=ON, SW6=OFF, SW7=ON, SW8=OFF, SW9=OFF

↓

PERIOD:T2 SOURCE OUTPUT AND VCOM OUTPUT ARE SHORT-CIRCUITED TO VCI POWER SOURCE
- VCOM OUTPUT = POTENTIAL VCI
- SOURCE POTENTIAL = POTENTIAL VCI
- SW1=ON, SW2=OFF, SW6=OFF, SW7=OFF, SW8=ON, SW9=OFF

↓

PERIOD:T3 VCOM OUTPUTS POTENTIAL VCOMH WHILE SOURCE IS SET TO Hiz STATE
- VCOM OUTPUT = POTENTIAL VCOMH
- SOURCE POTENTIAL = POTENTIAL IN T2 PERIOD + (VCOMH - VCI). THEREFORE, IT IS POTENTIAL VCOMH
- SW1=OFF, SW2=OFF, SW6=ON, SW7=OFF, SW8=OFF, SW9=OFF

↓

PERIOD:T4 VCOM OUTPUTS VCOMH AND SOURCE IS SET TO TARGET POTENTIAL
- VCOM OUTPUT = POTENTIAL VCOMH
- SOURCE POTENTIAL = TARGET POTENTIAL
- SW1=OFF, SW2=ON, SW6=ON, SW7=OFF, SW8=OFF, SW9=OFF

Fig. 21

| COLOR | ITEM | PERIOD T1 | PERIOD T2 | PERIODT3 | PERIOD T4 | PERIOD T5 | TOTAL |
|---|---|---|---|---|---|---|---|
| WHITE | VCOM POTENTIAL | -1.0[V] | 2.8[V] | 4.0[V] | 4.0[V] | | 1.0[V]*C |
| | VCOM CHARGE CONSUMPTION | 0 | 0 | 0 | 0 | | |
| | SOURCE POTENTIAL | 0.5[V] | 2.8[V] | 4.0[V] | 4.5[V] | | |
| | SOURCE CHARGE CONSUMPTION | 0 | 0 | 0 | 0.5[V]*C (DOUBLE) | | |
| | TOTAL CHARGE CONSUMPTION (CONVERTED BY VCI) | 0 | 0 | 0 | 1.0[V]*C | | |
| GRAY | VCOM POTENTIAL | -1.0[V] | 2.8[V] | 4.0[V] | 4.0[V] | | 3.0[V]*C |
| | VCOM CHARGE CONSUMPTION | 0 | 0 | 0 | 1.5[V]*C (DOUBLE) | | |
| | SOURCE POTENTIAL | 2.5[V] | 2.8[V] | 4.0[V] | 2.5[V] | | |
| | SOURCE CHARGE CONSUMPTION | 0 | 0 | 0 | 0 | | |
| | TOTAL CHARGE CONSUMPTION (CONVERTED BY VCI) | 0 | 0 | 0 | 3.0[V]*C | | |
| BLACK | VCOM POTENTIAL | -1.0[V] | 2.8[V] | 4.0[V] | 4.0[V] | | 7.0[V]*C |
| | VCOM CHARGE CONSUMPTION | 0 | 0 | 0 | 3.5[V]*C (DOUBLE) | | |
| | SOURCE POTENTIAL | 4.5[V] | 2.8[V] | 4.0[V] | 0.5[V] | | |
| | SOURCE CHARGE CONSUMPTION | 0 | 0 | 0 | 0 | | |
| | TOTAL CHARGE CONSUMPTION (CONVERTED BY VCI) | 0 | 0 | 0 | 7.0[V]*C | | |

TOTAL 11.0[V]*C

Fig. 23

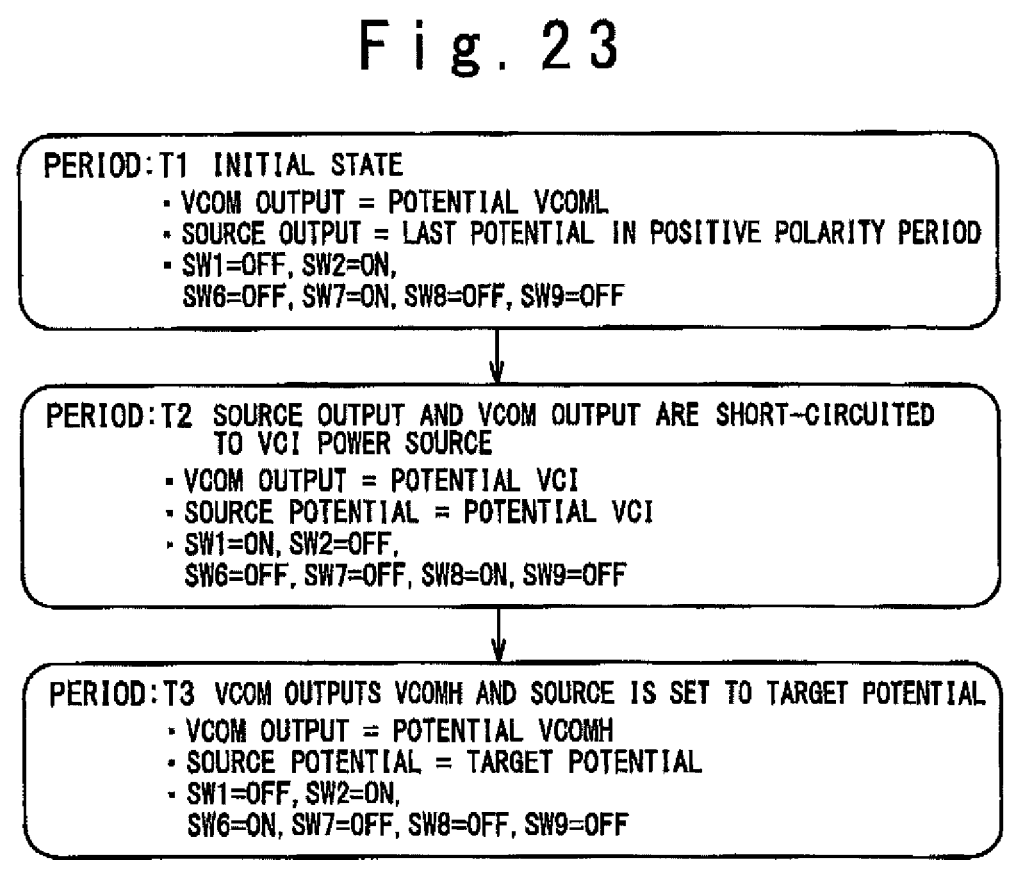

PERIOD:T1 INITIAL STATE
- VCOM OUTPUT = POTENTIAL VCOML
- SOURCE OUTPUT = LAST POTENTIAL IN POSITIVE POLARITY PERIOD
- SW1=OFF, SW2=ON, SW6=OFF, SW7=ON, SW8=OFF, SW9=OFF

↓

PERIOD:T2 SOURCE OUTPUT AND VCOM OUTPUT ARE SHORT-CIRCUITED TO VCI POWER SOURCE
- VCOM OUTPUT = POTENTIAL VCI
- SOURCE POTENTIAL = POTENTIAL VCI
- SW1=ON, SW2=OFF, SW6=OFF, SW7=OFF, SW8=ON, SW9=OFF

↓

PERIOD:T3 VCOM OUTPUTS VCOMH AND SOURCE IS SET TO TARGET POTENTIAL
- VCOM OUTPUT = POTENTIAL VCOMH
- SOURCE POTENTIAL = TARGET POTENTIAL
- SW1=OFF, SW2=ON, SW6=ON, SW7=OFF, SW8=OFF, SW9=OFF

Fig. 24

| COLOR | ITEM | PERIOD T1 | PERIOD T2 | PERIODT3 | PERIOD T4 | PERIOD T5 | TOTAL |
|---|---|---|---|---|---|---|---|
| WHITE | VCOM POTENTIAL | -1.0[V] | 2.8[V] | 4.0[V] | | | 1.0[V] *C |
| | VCOM CHARGE CONSUMPTION | 0 | 0 | 0 | | | |
| | SOURCE POTENTIAL | 0.5[V] | 2.8[V] | 4.5[V] | | | |
| | SOURCE CHARGE CONSUMPTION | 0 | 0 | 0.5[V]*C (DOUBLE) | | | |
| | TOTAL CHARGE CONSUMPTION (CONVERTED BY VCI) | 0 | 0 | 1.0[V]*C | | | |
| GRAY | VCOM POTENTIAL | -1.0[V] | 2.8[V] | 4.0[V] | | | 3.0[V] *C |
| | VCOM CHARGE CONSUMPTION | 0 | 0 | 1.5[V]*C (DOUBLE) | | | |
| | SOURCE POTENTIAL | 2.5[V] | 2.8[V] | 2.5[V] | | | |
| | SOURCE CHARGE CONSUMPTION | 0 | 0 | 0 | | | |
| | TOTAL CHARGE CONSUMPTION (CONVERTED BY VCI) | 0 | 0 | 3.0[V]*C | | | |
| BLACK | VCOM POTENTIAL | -1.0[V] | 2.8[V] | 4.0[V] | | | 7.0[V] *C |
| | VCON CHARGE CONSUMPTION | 0 | 0 | 3.5[V]*C (DOUBLE) | | | |
| | SOURCE POTENTIAL | 4.5[V] | 2.8[V] | 0.5[V] | | | |
| | SOURCE CHARGE CONSUMPTION | 0 | 0 | 0 | | | |
| | TOTAL CHARGE CONSUMPTION (CONVERTED BY VCI) | 0 | 0 | 7.0[V]*C | | | |

TOTAL 11.0[V]*C

Fig. 28

| COLOR | ITEM | PERIOD T1 | PERIOD T2 | PERIODT3 | PERIOD T4 | PERIOD T5 | TOTAL |
|---|---|---|---|---|---|---|---|
| WHITE | VCOM POTENTIAL | 4.0[V] | 2.8[V] | 0[V] | -1.0[V] | -1.0[V] | 7.1[V]*C |
| | VCOM CHARGE CONSUMPTION | 0 | 0 | 0 | 1.0[V]*C | 2.3[V]*C | |
| | SOURCE POTENTIAL | 4.5[V] | 2.8[V] | 2.8[V] | 2.8[V] | 0.5[V] | |
| | SOURCE CHARGE CONSUMPTION | 0 | 0 | 2.8[V]*C | 1.0[V]*C | 0 | |
| | TOTAL CHARGE CONSUMPTION (CONVERTED BY VCI) | 0 | 0 | 2.8[V]*C | 2.0[V]*C | 2.3[V]*C | |
| GRAY | VCOM POTENTIAL | 4.0[V] | 2.8[V] | 0[V] | -1.0[V] | -1.0[V] | 5.1[V]*C |
| | VCOM CHARGE CONSUMPTION | 0 | 0 | 0 | 1.0[V]*C | 0.3[V]*C | |
| | SOURCE POTENTIAL | 2.5[V] | 2.8[V] | 2.8[V] | 2.8[V] | 2.5[V] | |
| | SOURCE CHARGE CONSUMPTION | 0 | 0 | 2.8[V]*C | 1.0[V]*C | 0 | |
| | TOTAL CHARGE CONSUMPTION (CONVERTED BY VCI) | 0 | 0 | 2.8[V]*C | 2.0[V]*C | 0.3[V]*C | |
| BLACK | VCOM POTENTIAL | 4.0[V] | 2.8[V] | 0[V] | -1.0[V] | -1.0[V] | 9.9[V]*C |
| | VCOM CHARGE CONSUMPTION | 0 | 0 | 0 | 1.0[V]*C | 1.7[V]*C | |
| | SOURCE POTENTIAL | 0.5[V] | 2.8[V] | 2.8[V] | 2.8[V] | 4.5[V] | |
| | SOURCE CHARGE CONSUMPTION | 0 | 0 | 2.8[V]*C | 1.0[V]*C | 1.7[V]*C (DOUBLE) | |
| | TOTAL CHARGE CONSUMPTION (CONVERTED BY VCI) | 0 | 0 | 2.8[V]*C | 2.0[V]*C | 5.1[V]*C | |

TOTAL 22.1[V]*C

Fig. 30

| POLARITY | INPUT | | | OUTPUT | DISPLAY |
|---|---|---|---|---|---|
| | POL | MSBDATA | S-SW1 | SW1_SEL | |
| NEGATIVE POLARITY DISPLAY | 1 | 0 | 0 | 0 | WHITE SIDE DISPLAY |
| | 1 | 0 | 1 | 1 | WHITE SIDE DISPLAY |
| | 1 | 1 | 0 | 0 | BLACK SIDE DISPLAY |
| | 1 | 1 | 1 | 1 | BLACK SIDE DISPLAY |
| POSITIVE POLARITY DISPLAY | 0 | 0 | 0 | 0 | WHITE SIDE DISPLAY |
| | 0 | 0 | 1 | 0 | WHITE SIDE DISPLAY |
| | 0 | 1 | 0 | 0 | BLACK SIDE DISPLAY |
| | 0 | 1 | 1 | 1 | BLACK SIDE DISPLAY |

Fig. 38

| DRIVE METHOD | DISPLAY COLOR | VCOM CHANGE (L ⇒ H) | | | VCOM CHANGE (H ⇒ L) | | |
|---|---|---|---|---|---|---|---|
| | | CHARGE CONSUMPTION | CURRENT [mA] | EFFECT | CHARGE CONSUMPTION | CURRENT [mA] | EFFECT |
| REFERENCE TECHNIQUE | WHITE | 1.0[V]*C | 0.0960 | — | 4.5[V]*C | 0.4320 | — |
| | GRAY | 3.0[V]*C | 0.2880 | — | 10.5[V]*C | 1.0080 | — |
| | BLACK | 7.0[V]*C | 0.6720 | — | 16.5[V]*C | 1.5840 | — |
| | AVERAGE | 3.67[V]*C | 0.3520 | — | 10.5[V]*C | 1.0080 | — |
| FIRST EMBODIMENT | WHITE | 1.0[V]*C | 0.0960 | — | 4.1[V]*C | 0.3936 | -9[%]REDUCE |
| | GRAY | 3.0[V]*C | 0.2880 | — | 4.9[V]*C | 0.4704 | -53[%]REDUCE |
| | BLACK | 7.0[V]*C | 0.6720 | — | 10.9[V]*C | 1.0464 | -34[%]REDUCE |
| | AVERAGE | 3.67[V]*C | 0.3520 | — | 6.63[V]*C | 0.6368 | -37[%]REDUCE |
| SECOND EMBODIMENT | WHITE | | | | 7.1[V]*C | 0.6816 | +58[%]INCREASE |
| | GRAY | | | | 5.1[V]*C | 0.4896 | -51[%]REDUCE |
| | BLACK | | | | 9.9[V]*C | 0.9504 | -40[%]REDUCE |
| | AVERAGE | | | | 7.37[V]*C | 0.7072 | -30[%]REDUCE |

LIQUID CRYSTAL DISPLAY PANEL DRIVING METHOD, LIQUID CRYSTAL DISPLAY DEVICE, AND LIQUID CRYSTAL DISPLAY DRIVER INCLUDING DRIVING AND SETTING A COUNTER ELECTRODE FOR COMMON INVERSION DRIVING

INCORPORATION BY REFERENCE

The present application is a Continuation application of U.S. patent application Ser. No. 12/289,587, filed on Oct. 30, 2008 now U.S. Pat. No. 8,294,652, which is based on Japanese patent application No. 2007-283116, filed on Oct. 31, 2007, the entire contents of which is incorporated herein by reference.

BACKGROUND OF THE INVENTION

1. Field of the Invention

The present invention relates to a liquid crystal display device and, more specifically, to a driving technique for a liquid crystal panel of a liquid crystal display device that employs common inversion driving.

2. Description of Related Art

In driving of the liquid crystal display, in order to avoid so-called ghosting, the inversion drive is performed. In the inversion drive, the polarity of a driving voltage applied to each pixel (that is, potential polarity of a pixel electrode for a counter electrode) at an appropriate time interval. As an example of inversion drive, in a frame inversion drive, a driving voltage of each pixel is inverted for every one frame period.

However, in a simple frame inversion drive, flickers tend to become apparent. Therefore, when performing the frame inversion drive, a polarity of the driving voltage applied to each pixel is inverted at adequate spatial interval for suppressing the flickers. For example, one of widely-employed inversion drive techniques is the dot inversion drive which drives pixels in such a manner that the polarities of the driving voltages for neighboring pixels become opposite from each other both in a vertical direction and a horizontal direction. Another one of those widely-employed inversion drive techniques is the horizontal line inversion drive which inverts a polarity of the driving voltage for each pixel by every prescribed number of horizontal line(s). The inversion cycle of the horizontal lines for inverting the driving voltage can be determined variously. For example, the horizontal line inversion drive which inverts a polarity of the driving voltage for every horizontal line is referred to as the 1H inversion drive. The horizontal line inversion drive which inverts the polarity of the driving voltage by a unit of two horizontal lines may be referred to as the 2H inversion drive.

The inversion drive can be classified from another viewpoint based on a method for driving the counter electrode. That is, the inversion drive can be largely classified into the common constant drive and the common inversion drive. The common constant drive is a driving method which keeps potential of the counter electrode constant. The common inversion drive is a driving method which inverts the potential of the counter electrode in accordance with a cycle at which a polarity of the driving voltage of the pixel is inverted. The common inversion drive is preferable than the common constant drive if it can be employed, since it is capable of reducing an operating voltage of a driving circuit which generates the driving voltage of the pixel. When the dot inversion drive is employed, the common inversion drive cannot be employed. Thus, the common constant drive is employed for such case. However, in a case where the horizontal line inversion drive is to be performed, the common inversion drive is normally employed.

One of the problems for employing the common inversion drive is that it requires large power for driving the counter electrode, since parasitic capacitance of the counter electrode is generally large. This is not preferable, because it increases the power consumption of the liquid crystal display device.

One of the methods for reducing the power consumption of the liquid crystal display device in a case that the common inversion drive is employed is to short-circuit source lines (also referred to as data lines or signal lines in general) of the liquid crystal display panel and the common electrodes before driving the common electrodes. This makes it possible to utilize electric charges accumulated in the source lines and the counter electrode effectively and to reduce the power required for driving the source lines and the counter electrode effectively. Such technique is disclosed in Japanese Laid-Open Patent Application JP-P2007-101570A (referred to as Patent Document 1 in the following), for example.

FIG. 1 is a block diagram showing a structure of a liquid crystal display device disclosed in the Patent Document 1. A driving device 600 for driving a liquid crystal display panel 512 includes a source line driving circuit 520 for driving source lines S1 to Sn and a power supply circuit 542. The power supply circuit 542 includes a counter electrode voltage supply circuit 560 which generates a counter electrode voltage to be supplied to a counter electrode VCOM, and supplies the counter electrode voltage to the counter electrode VCOM. The source line driving circuit 520 includes short-circuiting circuits SHT1 to SHTN for short-circuiting the counter electrode VCOM and the source lines S1 to Sn. The short-circuiting circuits SHT1 to SHTN operate in response to a polarity signal POI, and a control signal BSC generated in accordance with an electric charge reuse period designating signal. The power supply circuit 542 includes the counter electrode voltage supply circuit 560 which generates the driving voltage of the counter electrode VCOM in accordance with the polarity of the driving voltage of the pixel, and a voltage setting circuit 562 which supplies either the voltage supplied from the counter electrode voltage supply circuit 560 or a set voltage VSET to the counter electrode VCOM. The set voltage VSET is a potential close to a ground potential VSS. The voltage setting circuit 562 operates in response to the control signal VSC that is generated in accordance with the polarity signal POL and the electric charge reuse period designating signal.

FIG. 2 is a timing chart showing an operation of the liquid crystal display device shown in FIG. 1. In FIG. 2, a curve with reference code SL shows variation of a potential of a given source line Sj, and a curve with reference code VCOM shows variation of a potential of the counter electrode VCOM. Note that FIG. 2 shows an operations of the liquid crystal display device when the liquid crystal display panel 512 is "normally-white".

In the liquid crystal display device shown in FIG. 1, driving procedures for the source lines S1 to Sn and the counter electrode VCOM are different for a case where the polarity of the driving voltage of the pixel is changed from positive to negative and for a case where the polarity is changed from negative to positive. In other words, the driving procedures are different for a case where the counter electrode VCOM is pulled up to a potential VCOMH and for a case where it is pulled down to a potential VCOML. Note here that the potential VCOMH is a predetermined positive potential that is to be set for the counter electrode VCOM when the polarity of the driving voltage of the pixel is negative, and the potential VCOML is a predetermined negative potential that is to be set for the counter electrode VCOM when the polarity of the driving voltage of the pixel is positive.

When the polarity of the driving voltage of the pixel is changed from positive to negative, first, the counter electrode VCOM is driven to the setting potential VSET. Specifically, the voltage setting period signal is asserted, the setting potential VSET is selected by the voltage setting circuit 562, and the counter electrode VCOM is driven to the setting potential VSET. Subsequently, the electric charge reuse period designating signal is asserted. Thereby, the counter electrode VCOM and the source lines S1 to Sn are short-circuited through the short-circuiting circuits STH1 to STHn. With this, the counter electrode VCOM and the source lines S1 to Sn come to have a mean potential of the source lines S1 to S2 and the counter electrode VCOM without electric power consumption. In this procedure, the counter electrode VCOM is driven to the setting potential in advance. This is done to prevent the source lines S1 to S2 from having a negative potential, when the counter electrode VCOM and the source lines S1 to Sn are short-circuited. After the counter electrode VCOM and the source lines S1 to Sn are short-circuited, each pixel connected to the source lines S1 to Sn is driven to a predetermined driving voltage.

In the meantime, when the polarity of the driving voltage of the pixel is changed from negative to positive, the counter electrode VCOM and the source lines S1 to Sn are short-circuited (without driving the counter electrode VCOM to the setting potential VSET). After the counter electrode VCOM and the source lines S1 to Sn are short-circuited, each pixel connected to the source lines S1 to Sn is driven to a predetermined driving voltage.

In any cases, by short-circuiting the counter electrode VCOM and the source lines S1 to Sn, the electric charges accumulated in the counter electrode VCOM or the source lines S1 to Sn are reutilized effectively. As a result, the power required for driving the counter electrode VCOM and the source lines S1 to Sn can be reduced.

SUMMARY

However, the inventor of the present invention has found that a process for changing the driving voltage of each pixel from negative to positive (that is, process for pulling down the counter electrode VCOM to the potential VCOML from the potential VCOMH) is not optimum in a reference technique described above, and that it is possible to reduce the power consumption further. This is related to a fact that the driving method of the above mentioned reference technique does not sufficiently consider that the source lines S1 to Sn are electrically coupled to the counter electrode VCOM by parasitic capacitance. As described above, with the driving method of the reference technique, the procedure for pulling down the counter electrode VCOM to the potential VCOML includes two steps. That is, the source lines S1 to Sn and the counter electrode VCOM are short-circuited in an electric charge reuse period and, thereafter, the source lines S1 to Sn are driven to a predetermined potential and the counter electrode VCOM is driven to the potential VCOML in a driving period. It is true that the power is not consumed in the electric charge reuse period, since the source lines S1 to Sn and the counter electrode VCOM are simply short-circuited in that period. However, unnecessarily large amount of power is consumed in the driving period, due to a fact that the source lines S1 to Sn are electrically coupled to the counter electrode VCOM by parasitic capacitance.

More specifically, with the driving method of the reference technique, the counter electrode VCOM is pulled down to the potential VCOML while driving the source lines S1 to Sn to a predetermined potential. When the counter electrode VCOM is pulled down, a potential of the source lines S1 to Sn also follows to go down because the source lines S1 to Sn are electrically coupled to the counter electrode VCOM by the parasitic capacitance. To drive the source lines S1 to Sn to the predetermined potential by canceling such action, the power for canceling such action that works to lower the potential of the source lines S1 to Sn is required in addition to the power required for driving the source lines S1 to Sn to the predetermined potential. That is, provided that the potential of the source lines S1 to Sn and the counter electrode VCOM after being short-circuited is $V_{SHT}$, and the predetermined potential of the source line Sj is Vj, it is necessary to have the power that can cancel the action working to pull down the source line Sj by an amount of voltage ($V_{SHT}$−VCOML) and then to pull up the source line Sj by an amount of voltage (Vj−$V_{SHT}$) in order to drive the source line Sj to the potential Vj.

Similarly, with the reference technique, the source lines S1 to Sn are pulled up, when pulling down the counter electrode VCOM to the potential VCOML. Since the source lines S1 to Sn are electrically coupled to the counter electrode VCOM by the parasitic capacitance, the potential of the counter electrode VCOM also follows to go up when the source lines S1 to Sn are pulled up. To drive the counter electrode VCOM to the predetermined potential VCOML by canceling such action, the power for canceling such action that works to boost up the potential of the counter electrode VCOM is required in addition to the power that is required for driving the counter electrode VCOM to the potential VCOML.

Such conditions bring particularly serious results when the source lines S1 to Sn are driven by a power supply voltage generated by a boost-up power supply. When driving the liquid crystal panel, normally, the source lines S1 to Sn are driven by a power supply voltage generated by a double boost-up power supply. For example, when the source lines S1 to Sn are pulled up by supplying an electric charge to the source lines S1 to Sn by the power supply voltage generated by the double boost-up power supply, the electric charge of twice as much is consumed compared to a case where the double boost-up power supply is not used. Therefore, the increase in the power required for driving the source lines S1 to Sn becomes more serious when using the boost-up power supply.

In the followings, electric changes required for driving the counter electrode VCOM and the source lines S1 to Sn when executing the operations of FIG. 2 will be calculated. In this calculation, it is assumed that the pixels of the liquid crystal display panels 512 are in a structure shown in FIG. 3. That is, a gate line Gi is connected to a gate of a TFT, and a source line Sj is connected to a source of the TFT. A drain of the TFT is connected to the pixel electrode and a storage capacitance Cst.

Electrically, a liquid crystal capacitance CI and the storage capacitance Cst are connected between the drain of the TFT and the counter electrode VCOM. A parasitic capacitance Csv is formed between the counter electrode VCOM and the source lines S1 to Sn, and a parasitic capacitance Cgv is formed between the counter electrode VCOM and the gate lines G1 to Gm.

When calculating the electric charges required for driving the counter electrode VCOM and the source lines S1 to Sn, only the parasitic capacitance Csv between the counter electrode VCOM and the source lines S1 to Sn is taken into consideration, and the liquid crystal pixel capacitance CI, the storage capacitance Cst, and the parasitic capacitance Cgv are neglected. Regarding the liquid crystal pixel capacitance CI and the storage capacitance Cat, the electric charges are transferred only between the liquid crystal capacitance CI and the storage capacitance Cst of each pixel of a selected line, and the capacitance per pixel is also insignificant. Thus, the electric current generated in the liquid crystal capacitance CI and the storage capacitance Cst is small, so that it is neglected in the explanations below. Regarding the parasitic capacitance of the gate line Gj, the capacitance of the gate of the TFT is more dominant than the parasitic capacitance Cgv between the counter electrode VCOM and the gate lines G1 to Gm. Further, the number of gate lines provided in the structure of the typical liquid crystal panel is smaller than that of the source lines, so that the parasitic capacitance Cgv is not so significant. Thus, it is neglected in the explanations below. The most influential factor for the current consumption when driving the counter electrode VCOM and the source lines S1 to Sn is the parasitic capacitance Csv between the counter electrode VCOM and the source lines S1 to Sn.

The electric charges are calculated under the following conditions.

It is assumed that the potential VCOML is −1 V, and the potential VCOMH is +4 V. The possible range of the source line potential is assumed to be +0.5 to 4.5 V. It is also assumed that a source line driving circuit and a circuit for generating the potential VCOMH are driven by a power supply voltage that is generated by the double boost-up power supply which operates by receiving the power supply voltage VCI (=2.8 V). In the meantime, it is assumed that the circuit for generating the potential VCOML is driven by the power supply voltage that is generated by a negative voltage power supply which operates by receiving the power supply voltage VCI (=2.8 V). Further, a factor that is most influential to the electric charge consumption when driving the counter electrode VCOM and the source lines S1 to Sn is the parasitic capacitance Csv between the counter electrode VCOM and the source lines S1 to Sn. Thus, the other parasitic capacitance Cgv, the liquid crystal pixel capacitance CI, and the storage capacitance Cst are neglected. The parasitic capacitance Csv between the source lines S1 to Sn and the counter electrode VCOM is assumed to be C[F]. Further, the liquid crystal panel is assumed to be a normally-white panel. That is, the source lines are driven to a potential that is close to the potential of the counter electrode VCOM for white, display (by which a pixel is displayed in white color), and the source lines are driven to a potential that is deviated from the potential of the counter electrode VCOM for black display. The source lines are driven to an intermediate potential for gray display.

FIG. 4 is a table showing the electric charge consumed when pulling up the counter electrode VCOM to the potential VCOMH from the potential VCOML. FIG. 5 is a table showing the electric charge consumed when pulling down the counter electrode VCOM from the potential VCOML, to the potential VCOMH.

(1) A Case Where Counter Electrode VCOM is Pulled Up from Potential VCOML to Potential VCOMH Hereinafter, at first, the calculation of the electric charge consumed when the LCD panel 2 provides black display is described.

A period T1 is considered as a period where the liquid crystal display device 1 is in an initial state. In the period T1, the counter electrode VCOM is kept to the potential VCOML (=−1 [V]). Further, the source lines S1 to Sn are driven to 4.5 V. In the period T1, there is no transfer of the electric charge, so that no electric charge is consumed.

In a period T2, the voltage setting period designating signal is asserted, and the counter electrode VCOM is driven to the setting potential VSET from the potential VCOML. In the Patent Document 1 mentioned above, it is so depicted that the setting potential VSET is the ground potential VSS or a potential slightly higher than the ground potential VSS. However, it is assumed herein that the setting potential VSET is the ground potential VSS. The source lines S1 to Sn are kept at 4.5 V. The counter electrode VCOM is pulled up from the potential VCOML to the ground potential VSS by discharging the electric charge of “1 [V]×C” to the ground line. Further, because of the variation in the counter electrode VCOM, the source lines S1 to Sn are to boost up by 1 [V]. However, the potential of the source lines S1 to Sn is kept at +4.5 [V] by discharging the electric charge of “1[V]×C” to the ground line. As a result, no electric charge is consumed also in the period T2.

In a period T3, the electric charge reuse period designating signal is asserted, and the source lines S1 to Sn and the counter electrode VCOM are short-circuited. With this, the potential of the source lines S1 to Sn and the counter electrode VCOM becomes +2.25 [V]. When the source lines S1 to Sn and the counter electrode VCOM are short-circuited, the electric charges are only cancelled but not supplied additionally. Thus, no electric charge is consumed in the period T3, and there is no consumption of the power.

In a period T4, the source lines S1 to Sn are driven from +2.25 [V] to +0.5 V, and the counter electrode VCOM is driven from +2.25 [V] to the potential VCOMH (=+4.0 [V]). At this time, the potential of the source lines S1 to Sn also follows to boost up because the counter electrode VCOM is pulled up. However, the electric charges are only released from the source lines S1 to Sn to the ground line, so that no electric charge is consumed in the source lines S1 to Sn. Thus, there is no consumption of the power.

In the meantime, the power is consumed in driving of the counter electrode VCOM. It should be noted that a larger amount of electric charge than that of a potential difference to be driven originally is consumed when driving the counter electrode VCOM, since the potential of the source lines S1 to Sn is lowered. The counter electrode VCOM is pulled up by a potential difference of +1.75 [V]. However, the potential of the source lines S1 to Sn is pulled down by 1.75 V, so that it is necessary to supply electric charges of “3.5 [V]×C” to the counter electrode VCOM as a result. The circuit for generating the potential VCOMH is driven by the double boost-up power supply, so that the electric charge of “7.0 [V]×C” is required for driving the counter electrode VCOM, when converting it on the basis of the power supply voltage VCI.

As a result of the above, the total amount of electric charge consumed in the periods T1 to T4 for providing black display is “7.0 [V]×C”. For displays of other colors, the electric charge consumption can be calculated similarly. FIG. 4 shows the results thereof.

(2) A Case Where Counter Electrode VCOM is Pulled Down from Potential VCOMH to Potential VCOML First, calculations of the electric charge consumption for providing black display will be described.

The period T1 is considered as a period where the liquid crystal display device is in the initial state. In the period T1, the counter electrode VCOM is kept to the potential VCOMH (=4.0 [V]). Further, the source lines S1 to Sn are driven to 0.5 V. In the period T1, there is no transfer of the electric charges, so that no electric charge is consumed.

In the period T2, the electric charge reuse period designating signal is asserted, and the source lines S1 to Sn and the counter electrode VCOM are short-circuited. With this, the potential of the source lines S1 to Sn and the counter electrode VCOM becomes +2.25 [V]. When the source lines S1 to Sn and the counter electrode VCOM are short-circuited, the electric charges are only cancelled but not supplied additionally. Thus, no power is consumed in the period T2.

In the period T3, the source lines S1 to Sn are driven from +2.25 [V] to +4.5 [V], and the counter electrode VCOM is driven from +2.25 [V] to the potential VCOML (=−1.0 [V]). The source lines S1 to Sn originally need to be pulled up by 2.25 V. However, the counter electrode VCOM is pulled down by 3.25V, so that it is necessary to supply the electric charge of "5.5 [V]×C" to the source lines S1 to Sn as a result. In addition, the source lines S1 to Sn are driven by a double boost-up power supply. Thus, the electric charge of "11.0 [V]×C" is required for driving the source lines 81 to Sn, when converting it on the basis of the power supply voltage VCI.

Furthermore, the counter electrode VCOM originally needs to be pulled down by 3.25 V when driving the counter electrode VCOM. However, the electric charge of more than that is required for driving the counter electrode VCOM. That is, it is necessary to supply the electric charge of "5.5 [V]×C" to the counter electrode VCOM for driving the counter electrode VCOM to the target potential VCOML (=−1.0 [V]), since the source lines S1 to Sn are pulled up by 2.25 V.

Therefore, the total amount of electric charge consumed in the periods T1 to T3 is "16.5 [v]×C". For displays of other colors, the electric charge consumption can be calculated similarly. FIG. 5 shows the results thereof.

In the above-described procedure executed for pulling down the counter electrode VCOM from the potential VCOMH to the potential VCOML, the power is consumed uneconomically. As will be described in detail hereinafter, it is possible to reduce the power consumption by pulling down the counter electrode VCOM to the potential VCOML by employing an optimum procedure.

According to an aspect of the present invention, a driving method of a liquid crystal display panel having a source line and a counter electrode includes:

(a) driving the counter electrode to a first potential being a high level of an amplitude of a potential of the counter electrode;

(b) setting the counter electrode and the source line to a second potential by short-circuiting the counter electrode and the source line to a power supply interconnection having the second potential lower than the first potential after the driving;

(c) connecting the counter electrode to a ground interconnection having a ground potential while the source line is kept to be short-circuited to the power supply interconnection after the setting;

(d) driving the counter electrode to a third potential being a low level of an amplitude of a potential of the counter electrode after the connecting; and (e) driving the source line to a potential corresponding to an image data after the connecting.

The (d) driving and the (e) driving may be executed at a same time. Or, the (e) driving is executed after the (d) driving.

In this aspect of the present invention, the following phenomena are effectively used (1) electric power is not consumed even when a counter electrode and a source line are short-circuited; (2) electric charge is not newly consumed when a counter electrode output is connected to ground terminal and the charge existing in the counter electrode is supplied to the ground terminal. As a result, it is possible to pull down the counter electrode from a first potential which is the high level potential of the amplitude of the counter electrode to a third potential which is the low level potential of the amplitude of the counter electrode by consuming less electric power.

The liquid display panel driving method of this aspect of the present invention is especially effective when the driving of the source line driven to a potential corresponding to the image data is performed by a driving circuit which is driven by a boost-up power source voltage generated by boosting-up a first power source voltage supplied by the first power source or a second power source voltage which is generated by regulator circuit from the boost-up power source voltage.

According to another aspect of the present invention, a liquid crystal display device includes:

a liquid crystal display panel having a source line and a counter electrode; and an LCD driver which comprises a source driver circuit having a source output connected to the source line, VCOM circuit having a VCOM output connected to the counter electrode and a power supply interconnection having a predetermined potential. The source driver circuit includes: a driving Section configured to drive the Source line; and a first switch connected between the source output and the power supply interconnection. The VCOM circuit includes: a first driving section configured to drive the counter electrode to a first potential being a high level of an amplitude of a potential of the counter electrode; a second switch connected between the counter electrode and the power supply interconnection; a third switch connected between the counter electrode and a ground interconnection; and a second driving section configured to drive the counter electrode to a third potential being a low level of an amplitude of a potential of the counter electrode. The predetermined potential of the power supply interconnection is lower than the first potential and higher than the ground interconnection.

A liquid crystal display apparatus having such a configuration is preferable for performing the aforementioned driving method of a liquid crystal display panel. Here, by such a representation "a component C connected between a component A and component B" includes a case in which another component exists between the component C and components A or B.

According to a preferable embodiment, the source driver circuit further includes: a common interconnection connected to the source output via the first switch; and a fourth switch connected between the common interconnection and the power supply interconnection. The second switch is connected between the VCOM output of the VCOM circuit and the common interconnection.

In this case, it is also preferable that the source driver circuit further includes: a fifth switch connected to the VCOM output in parallel with the second switch and connected between the VCOM output and the power supply interconnection.

According to an embodiment of the present invention, it is possible to effectively reducing the power required for pulling down the counter electrode from the positive potential to the negative potential.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 4 is a table showing electric charges consumed when pulling up a counter electrode from a potential VCOML to a potential VCOMH in a operation, shown in FIG. 2;

FIG. 5 is a table showing electric charges consumed when pulling down the counter electrode from the potential VCOMH to the potential VCOML in the operation shown in FIG. 2;

FIG. 68 is a block diagram showing a structure of a power supply circuit that is built-in to an LCD driver of a first embodiment;

FIG. 8B is a flowchart showing an example of an operation when pulling down the counter electrode of the liquid crystal display device according to a first embodiment from the potential VCOML to the potential VCOMH;

FIG. 14 is a table showing electric charges consumed in the operations shown in FIGS. 7A and 8A;

FIG. 16 is a flowchart showing an example of operations when pulling up the counter electrode of the liquid crystal display device according to a first embodiment from the potential VCOML to the potential VCOMH;

FIG. 21 is a table showing electric charges consumed in the operations shown in FIGS. 15 and 16;

FIG. 23 is a flowchart showing another example of operations when pulling up the counter electrode of the liquid crystal display device according to a first embodiment from the potential VCOML to the potential VCOMH;

FIG. 24 is a table showing electric charges consumed in the operations shown in FIGS. 22 and 23;

FIG. 28 is a table showing electric charges consumed in the operations shown in FIGS. 25 and 26;

FIG. 30 is a true-value table showing operations of a data judging circuit loaded on the source driver circuit of a third embodiment;

FIG. 38 is a table showing electric charges consumed respectively in a liquid crystal display device of a reference technique, the liquid crystal display device of a first embodiment, and the liquid crystal display device of a second embodiment.

DESCRIPTION OF THE PREFERRED EMBODIMENTS

Hereinafter, a semiconductor storage device and a memory cell test method according to embodiments of the present invention will be described with reference to the attached drawings.

First Embodiment

Structure of Liquid Crystal Display Device

Figure 6A:
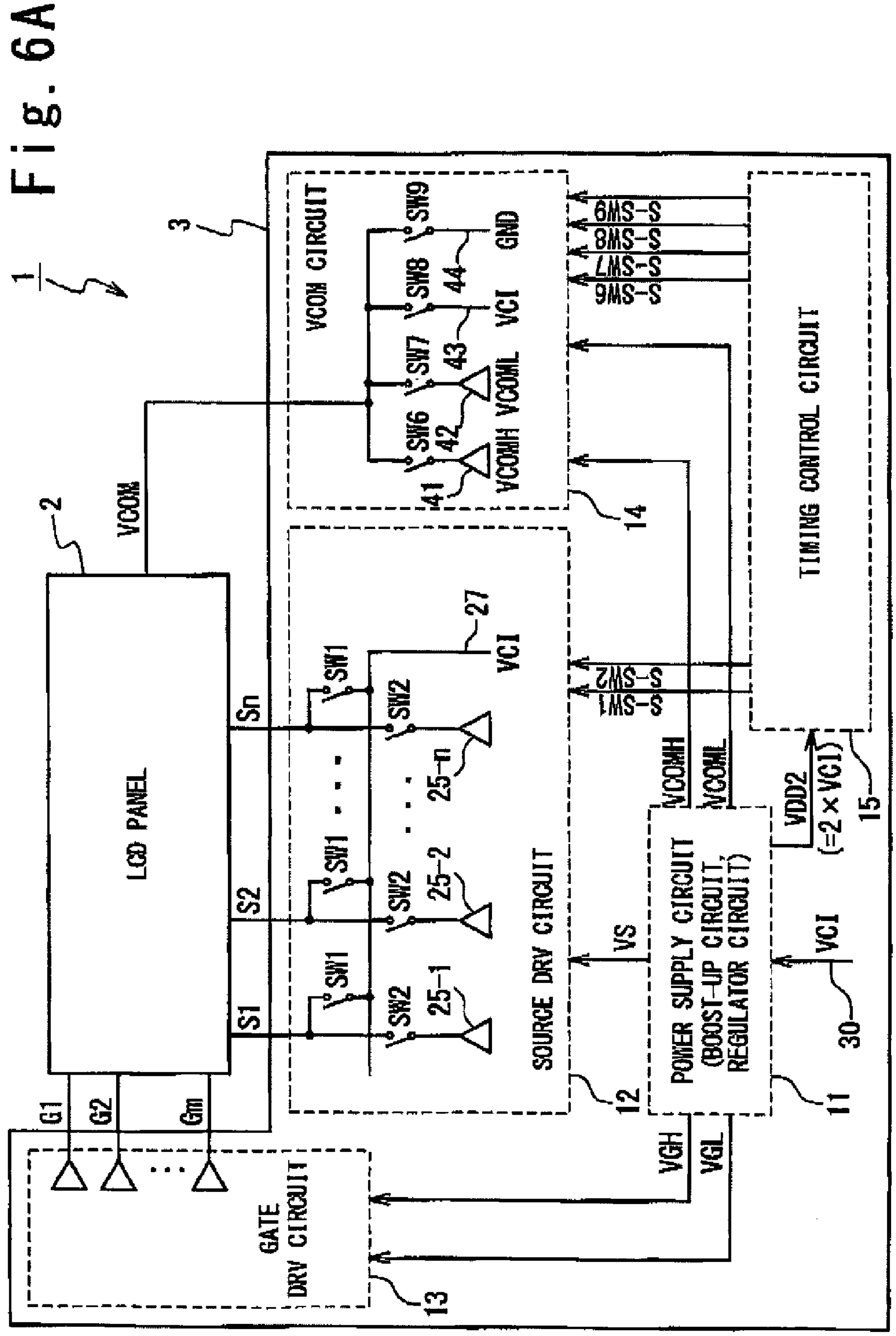
FIG. 6A is a block diagram showing a structure of a liquid crystal display device according to a first embodiment of the present invention.

FIG. 6A is a block diagram showing a structure of a liquid crystal display device 1 according to a first embodiment of the present invention. The liquid crystal display device of a first embodiment includes an LCD panel 2 and an LCD driver 3. The LCD driver 3 includes a power supply circuit 11, a source driver circuit 12, a gate driver circuit 13, a VCOM circuit 14, and a timing control circuit 15.

The power supply circuit 11 generates supply voltages with voltage levels corresponding to each circuit from a power supply voltage VCI that is supplied form a VCI power supply interconnection 30. The VCI power supply interconnection 30 is an interconnection for supplying the power supply voltage VCI to the power supply circuit 11 from a VCI power supply (not shown). The VCI power supply may be integrated to the LCD driver or may be provided externally.

More specifically, the power supply circuit 11 supplies a power supply voltage VS to the source driver circuit 12, and supplies power supply voltages VGH, VGL to the gate driver circuit 13. Note here that the power supply voltage VGH is a power supply voltage used for pulling up gate lines Gj and the power supply voltage VGL is a power supply voltage used for pulling down the gate lines Gj. Further, the power supply circuit 11 supplies power supply voltages VCOMH, VCOML to the VCOM circuit 14, and supplies a double boost-up power supply VDD2 to the timing control circuit 15. The power supply voltage VCOMH is a power supply voltage used for pulling up a counter voltage VCOM, and the power supply voltage VCOML is a power supply voltage used for pulling down the counter voltage VCOM. The double boost-up power supply VDD2 is a power supply voltage obtained by performing double boost-up of the power supply voltage VCI.

Figure 6B:
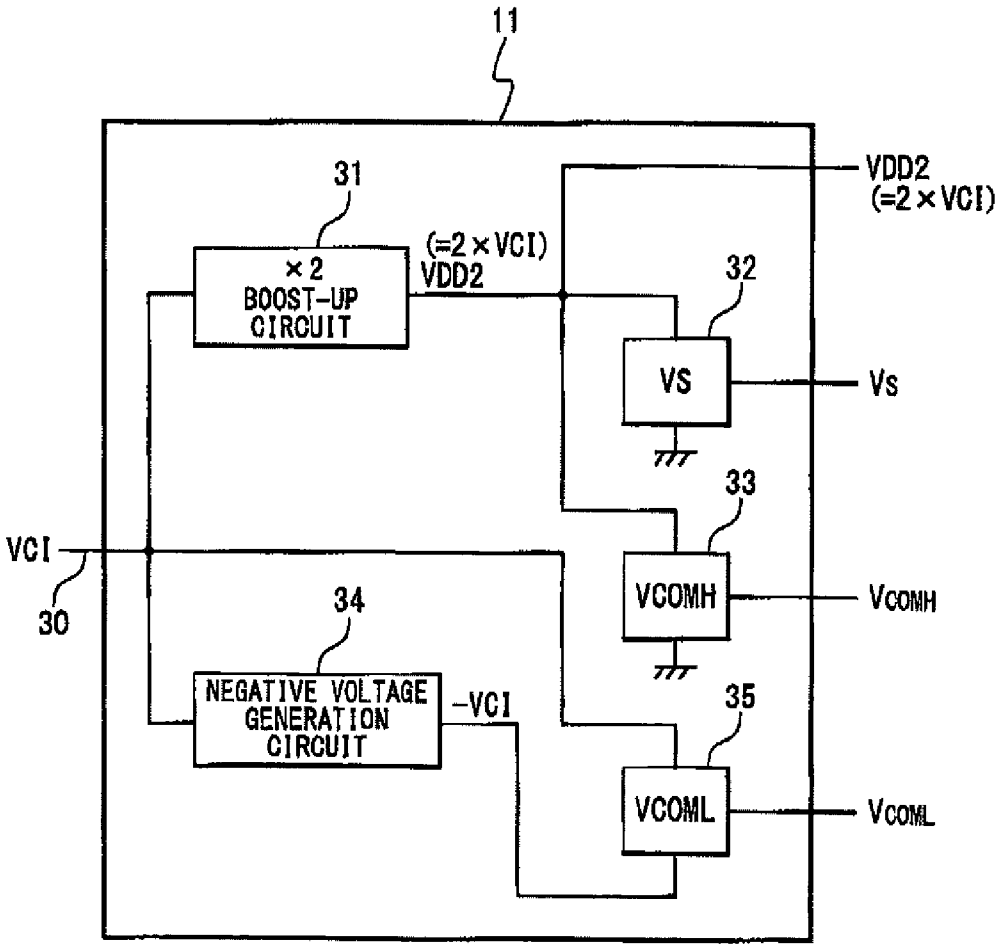
FIG. 6C is a block diagram showing a structure of a source driver circuit of the LCD driver according to a first embodiment.

FIG. 6B is a block diagram showing a structure of a part of the power supply circuit 11, which generates the power supply voltage VS, the power supply voltages VCOMH, VCOML, and the double boost-up power supply VDD2. The power supply circuit 11 includes a double boost-up circuit 31, a VS regulator circuit 32, a VCOMH regulator circuit 33, a negative voltage generation circuit 34, and a VCOML regulator circuit 35. The double boost-up circuit 31 performs double boost-up of the power supply voltage VCI that is supplied from the VCI power supply interconnection 30 so as to generate the double boost-up power supply VDD2. Upon receiving a supply of the double boost-up power supply VDD2, the VS regulator 32 generates the power supply voltage VS that is slightly lower than the double boost-up power supply VDD2, and supplies the generated power supply voltage VS to the source driver circuit 12. Upon receiving a supply of the double boost-up power supply VDD2, the VCOMH regulator 33 generates the power supply voltage VCOMH that is slightly lower than the double boost-up power supply VDD2, and supplies the generated power supply voltage VCOMH to the VCOM circuit 14. The negative voltage generation circuit 34 generates a negative voltage VCI from the power supply voltage VCI, and supplies the power supply voltage −VCI to the VCOML regulator circuit 35. The VCOML regulator circuit 35 generates the power supply voltage VCOML in a range of the power supply voltage VCI to the negative voltage −VCI, and supplies the generated power supply voltage VCOML to the VCOM circuit 14. Typically, the power supply voltage VCI is 2.8 V (that is, the double boost-up power supply voltage VDD2 is 5.6 V), the power supply voltage VS is 5.0 V, the power supply voltage VCOMH is 4.0 V, and the power supply voltage VCOML is −1.0 V. It is possible for the double boost-up power supply VDD2 to be supplied to the source driver circuit 12 instead of the power supply voltage VS so as to operate the source driver 12 by the double boost-up power supply VDD2.

When the electric charges are consumed in circuits to which the power supply voltage VS and the power supply voltage VCOMH are supplied, it is to be noted that the electric charges of twice as much are consumed in the VCI power supply interconnection 30. This means that it is highly effective to reduce the electric charges consumed in the circuits to which the power supply voltage VS and the power supply voltage VCOMH are supplied, in order to reduce power consumption.

Figure 6C:
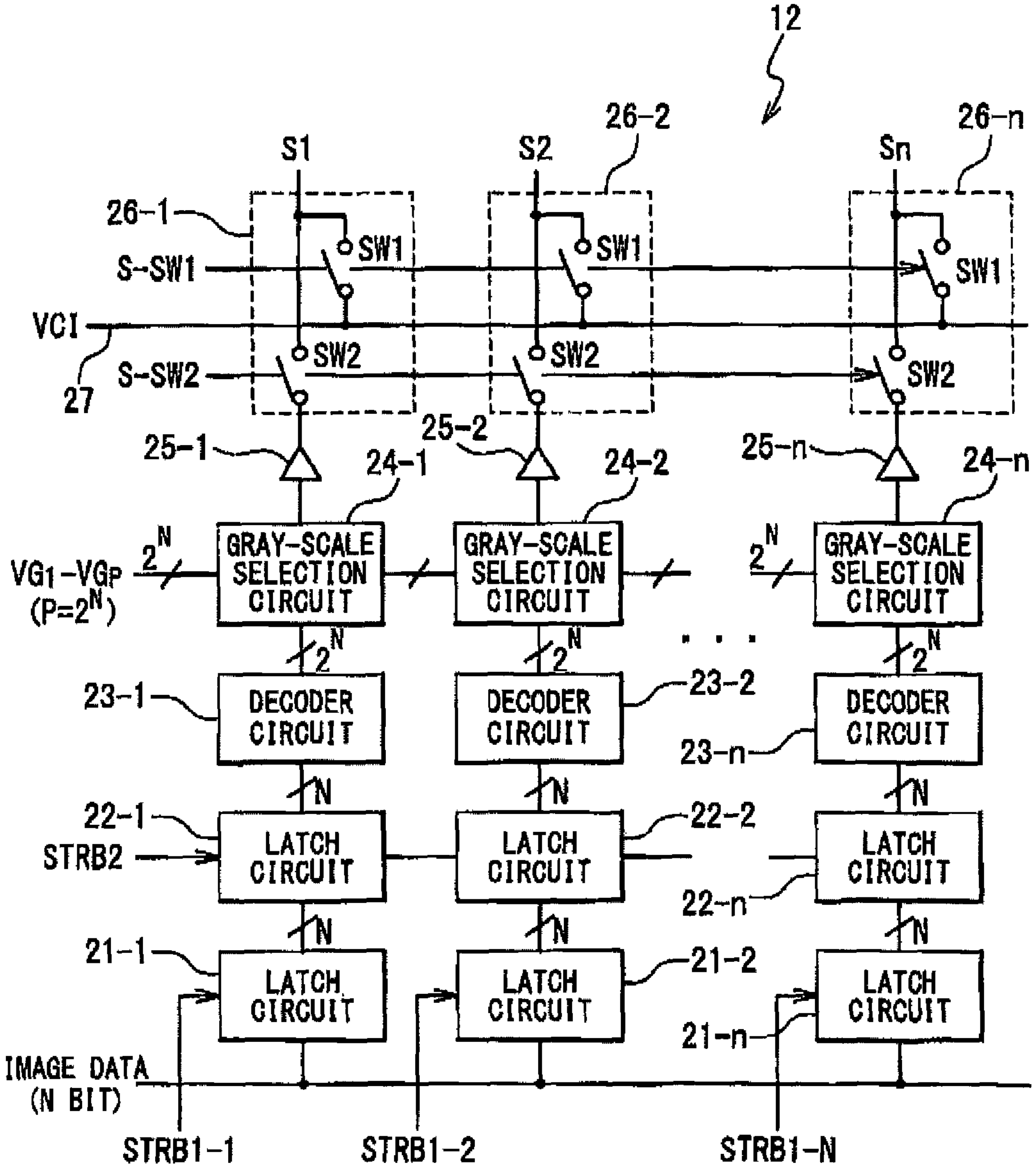

The source driver circuit 12 has source lines S1 to Sn of the LCD panel 2 connected to its output, and drives the source lines S1 to Sn. An output of the source driver circuit 12 may be referred to as a "source output" hereinafter. FIG. 6C is a block diagram showing an example of a structure of the source driver circuit 12. The source driver circuit 12 includes latch circuits 21-1 to 21-*n*, latch circuits 22-1 to 22-*n*, decoder circuits 23-1 to 23-*n*, gray-scale selection circuits 24-1 to 24-*n*, output amplifiers 25-1 to 25-*n*, output control circuits 26-1 to 26-*n*, and a VCI power supply interconnection 27.

Each of the latch circuits 21-1 to 21-*n* successively latches N-bit image data transmitted successively to the source driver circuit 12, in response to strobe signals STRB1-1 to STRS1-*n*. More specifically, the strobe signals STRB1-1 to STRB1-*n* are asserted by Synchronizing with the image data transferred successively to the source driver circuit 12. Each latch circuit 21-*j* latches the image data, when a corresponding strobe signal STRB1-*j* is asserted. The latch circuits 21-1 to 21-*n* latch the image data for pixels of one horizontal line all together. More specifically, the latch circuits 21-1 to 21-*n* latch the image data of the pixels corresponding to the gate lines Gj+1 that are selected in a next horizontal scanning period.

Each of the latch circuits 22-1 to 22-*n* latches the image data latched by the latch circuits 21-1 to 21-*n* simultaneously or by shifting the timing slightly for dispersing peak currents, in response to a common strobe signal SRTB2. The latch circuits 22-1 to 22-*n* latch the image data of the pixels corresponding to the gate lines Gj selected in a current horizontal scanning period.

The decoder circuits 23-1 to 23-*n* decode the image data received from the latch circuits 22-1 to 22-*n*, and outputs $2^N$-numbers of selection signals. Further, depending on a circuit structure, a level shifter circuit may be inserted between the decoder circuits 23-1 to 23-*n* and the latch circuits 22-1 to 22-*n*.

The gray-scale selection circuits 24-1 to 24-*n* selects one gray-scale voltage VG from gray-scale voltages $VG_1$ to $VG_P$, in response to the selection signals received from the decoder circuits 23-1 to 23-*n*.

Output amplifiers 25-1 to 25-*n* output a driving voltage corresponding to the gray-scale voltage VG selected by the gray-scale selection circuits 24-1 to **24-*n*. The source lines S1 to Sn are driven to a predetermined voltage level by the output amplifiers 25-1 to 25-*n***.

The output control circuits 26-1 to **26-*n* are circuits for switching connecting relations of the output terminals (that is, the source lines S1 to Sn) of the source driver circuit 12, the output amplifiers 25-1 to 25-*n*, and the VCI power supply interconnection 27. Note here that the VCI power supply interconnection 27 is an interconnection through which the power supply voltage VCI is supplied from the VCI power supply (not shown), and it is electrically connected to the VCI power supply interconnection 30 that is connected to the power supply circuit 11. The potential of the VCI power supply interconnection 27** is kept to the potential VCI by the VCI power supply.

Each of the output control circuits 26-1 to **26-*n* includes a switch SW1 and a switch SW2. The switches SW1 are connected between the source outputs of the source driver circuit 12 and the VCI power supply interconnection 27. The switches SW2 are connected between the source outputs and the output amplifiers 25-1 to 25-*n*. The switches SW1 are turned on/off in response to a control signal S-SW1 supplied from the timing control circuit 15, and the switches SW2 are turned on/off in response to a control signal S-SW2. When the switches SW1 are turned on, the source lines S1 to Sn are electrically connected to the VCI power supply interconnection 27, and the source lines S1 to Sn are driven to the potential VCI. In the meantime, when the switches SW2 are turned on, the source lines S1 to Sn are electrically connected to the output amplifiers 25-1 to 25-*n*, and the source lines S1** to Sn are driven thereby to a potential corresponding to the image data.

Note here that the decoder circuits 23-1 to **23-*n*, the gray-scale selection circuits 24-1 to 24-*n*, the output amplifiers 25-1 to 25-*n*, and the output control circuits 26-1 to 26-*n* are operated by receiving the supply of the power supply voltage VS generated from the double boost-up power supply voltage VDD2. When the electric charges are consumed in those circuits, electric charges of twice as much are consumed in the VCI power supply interconnection 30**.

Further, note here that the configuration of the source driver circuit 12 can be modified variously. For example, the output amplifiers 25-1 to **25-*n* may be omitted from the source driver circuit 12**.

Referring back to FIG. 6A, the gate driver circuit 13 is a circuit for driving the gate lines G1 to Gm by receiving the supply of power supply voltages VGH and VGL. The gate driver circuit 13 scans and drives the gate lines G1 to Gm successively.

The VCOM circuit 14 has the counter electrode VCOM connected to its output, and functions to drive the counter electrode VCOM. The output of the VCOM circuit 14 may be referred to as a VCOM output hereinafter. The VCOM circuit 14 includes a VCOMH output amplifier 41, a VCOML output amplifier 42, a VCI power supply interconnection 43, a ground interconnection 44, and switches SW6 to SW9. The power supply voltage VCOMH is supplied to the VCOMH output amplifier 41, and it is used for pulling up the counter electrode VCOM to the potential VCOMH. In the meantime, the power supply voltage VCOML is supplied to the VCOML output amplifier 42, and it is used for pulling down the counter electrode VCOM to the potential VCOML. The VCI power supply interconnection 43 is an interconnection connected to the VCI power supply, and a potential of the VCI power supply interconnection 43 is kept to the potential VCI. The VIC power supply interconnection 43 is electrically connected to the VCI power supply interconnections 27 and 30 described above. The ground interconnection 44 is an interconnection kept to the ground potential VSS. The switch SW6 is connected between the VCOM output of the VCOM circuit 14 and the VCOMH output amplifier 41, and it is turned on/off in response to a control signal S-SW6 that is supplied from the timing control circuit 15. The switch SW7 is connected between the VCOM output and the VCOML output amplifier 42, and it is turned on/off in response to a control signal S-SW7 that is supplied from the timing control circuit 15. The switch SW8 is connected between the VCOM output and the VCI power supply interconnection 43, and it is turned on/off in response to a control signal S-SW8 that is supplied from the timing control circuit 15. The switch SW9 is connected between the VCOM output and the ground potential VSS44, and it is turned on/off in response to a control signal S-SW9 that is supplied from the timing control circuit 15.

The VCOMH output amplifier 41 operates by receiving the power supply voltage VCOMH generated from the double boost-up power supply voltage VDD2, and it is noted that when the electric charges are consumed in the VCOM output amplifier 41, the electric charges of twice as much are consumed in the VCI power supply interconnection 30.

The timing control circuit 15 controls timings of the LCD driver 3. More specifically, the timing control circuit 15 supplies the control signals S-SW1, S-SW2 to the source driver circuit 12, and supplies the control signals S-SW6 to S-SW9 to the VCOM circuit 14.

[Operations]

A most distinctive point in the operations of the liquid crystal display device 1 according to a present embodiment is the procedure for changing the polarity of the driving voltage from negative to positive, i.e., the procedure for pulling down the counter electrode VCOM from the potential VCOMH to the negative potential VCOML. In a present embodiment, the procedure for pulling down the counter electrode VCOM to the negative potential VCOML is optimized so as to achieve reduction of the power consumption.

Figure 7A:
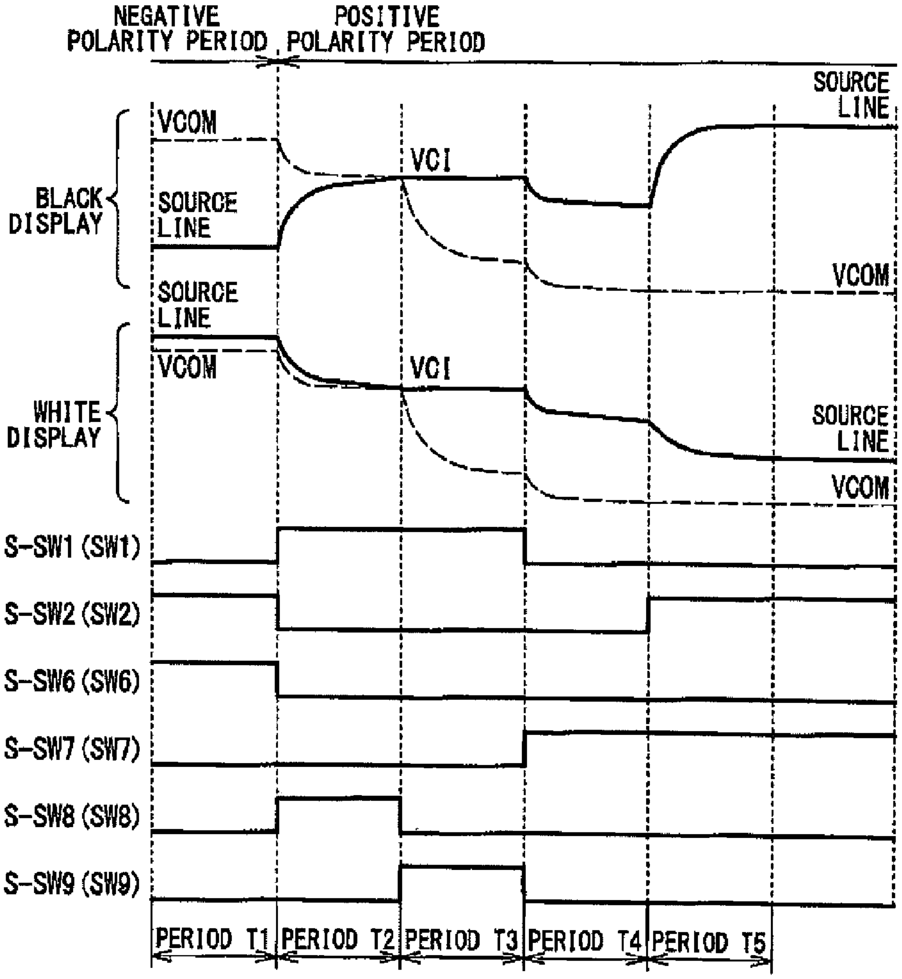
FIG. 7A is a timing chart showing an example of an operation when pulling down a counter electrode of the liquid crystal display device according to a first embodiment from the potential VCOMH to the potential VCOML.

More specifically, as shown in FIG. 7A, in a present embodiment, the source lines S1 to Sn and the counter electrode VCOM are short-circuited to the VCI power supply to be the potential VCI and, thereafter, the counter electrode VCOM is connected to a ground interconnection to pull it down to the ground potential while keeping the source lines S1 to Sn to the potential VCI. Further, the source lines S1 to Sn are driven to a predetermined potential. The operation for short-circuiting the source lines S1 to Sn and the counter electrode VCOM to the VCI power supply can be executed without consuming the electric charge. Further, for an operation executed to connect the counter electrode VCOM to the ground interconnection, the electric charge is consumed in the source lines S1 to Sn but not consumed in the counter electrode VCOM. After those operations, the counter electrode VCOM is pulled down to the negative potential VCOML. With this, the counter electrode VCOM can be pulled down from the potential VCOMH to the negative potential VCOML, while reducing the power consumption.

Figure 1:
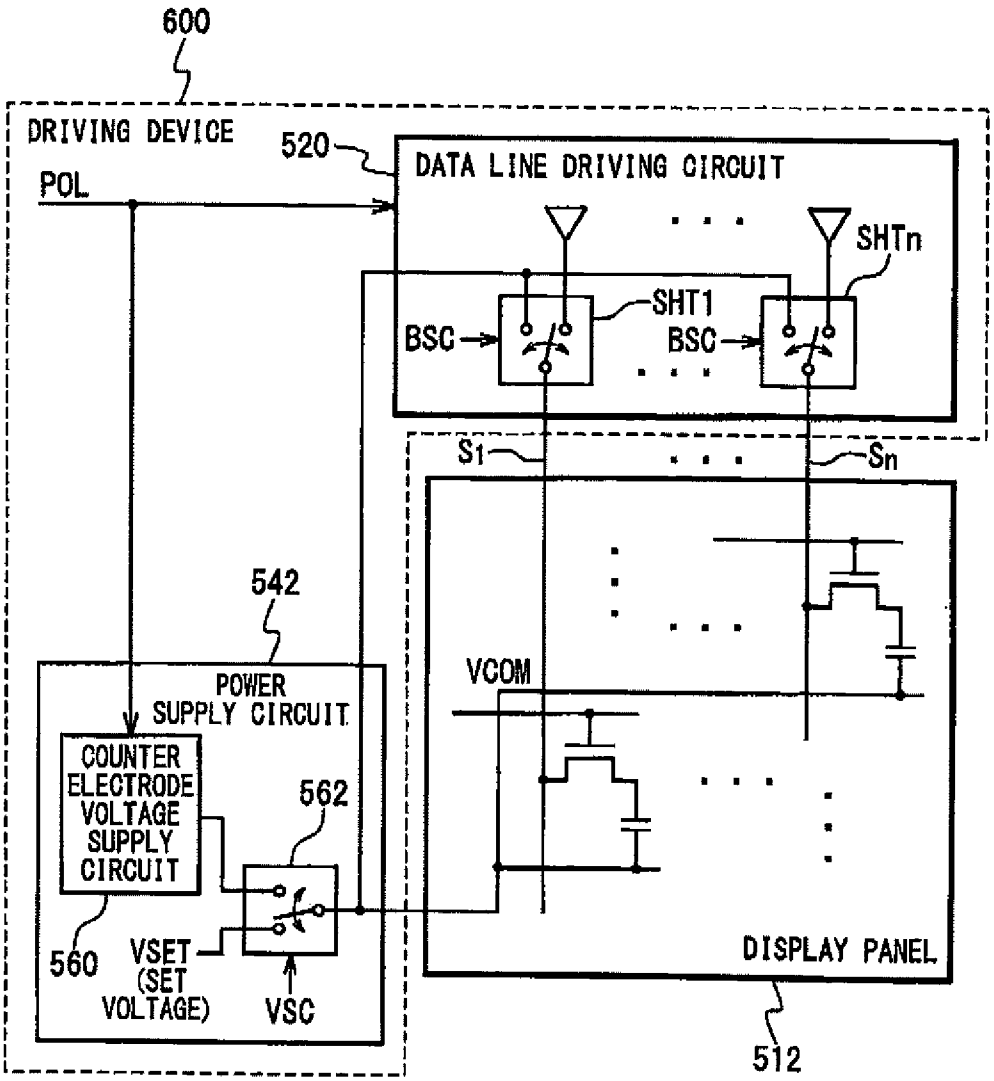
FIG. 1 is a block diagram showing a structure of a liquid crystal display device according to a reference technique.
Figure 2:
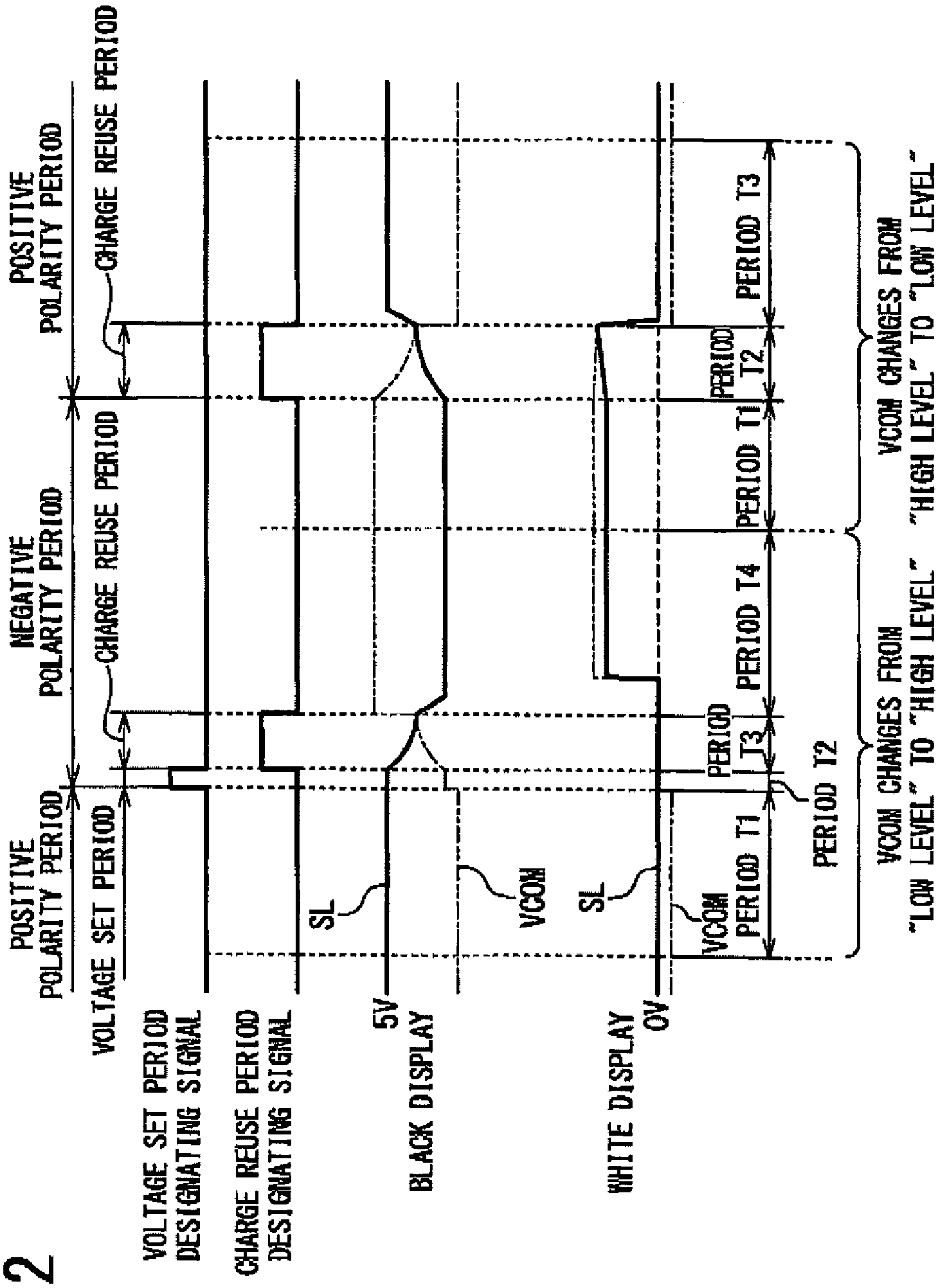
FIG. 2 is a timing chart showing an operation of a liquid crystal display device shown in FIG. 1.
Figure 3:
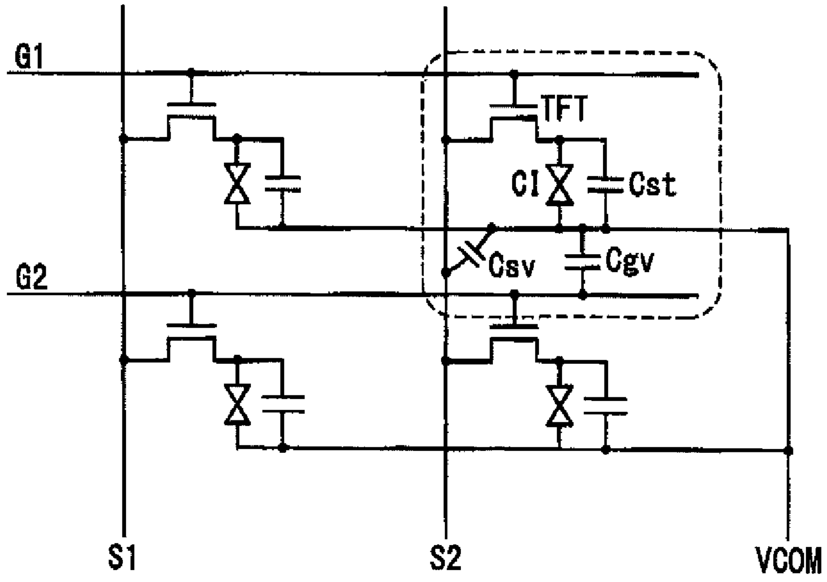
FIG. 3 is a circuit diagram showing a typical structure of pixels of a liquid crystal display panel.

With a reference technique shown in FIG. 2, the counter electrode VCOM and the source lines S1 to Sn are driven simultaneously. Thus, the power is consumed uneconomically in both the counter electrode VCOM and the source lines S1 to Sn. That is, there is required an extra power for canceling the influence that is generated because the source lines S1 to Sn are pulled up when driving the counter electrode VCOM, and there is required an extra power for canceling the influence that is generated because the counter electrode VCOM is pulled down when driving the source lines S1 to Sn. With the operation of a present embodiment, however, when driving the source lines S1 to Sn, there is required only a half the power since the influence by the pull-down of the counter electrode VCOM is cancelled while being short-circuited to the VCI power supply, without using the double boost-up power supply. Further, for driving the source lines S1 to Sn to the target potential thereafter, the power for driving the source lines S1 to Sn can be reduced since the change in the potential is small. The source lines S1 to Sn are driven by using the power supply voltage VS generated from the double boost-up power supply voltage VDD2, so that reduction of the electric charges required for driving the source lines S1 to Sn is effective for reducing the power consumption.

In a strict sense, there is such a disadvantage in the operations of this embodiment that it requires an additional power to keep the source lines S1 to Sn to the potential VCI, when pulling down the counter electrode VCOM to the ground potential VSS. However, this power is smaller compared to the increase in the power required for simultaneously driving the counter electrode VCOM and the source lines S1 to Sn. Hereinafter, the operations of this embodiment will be described in details.

Figure 8A:
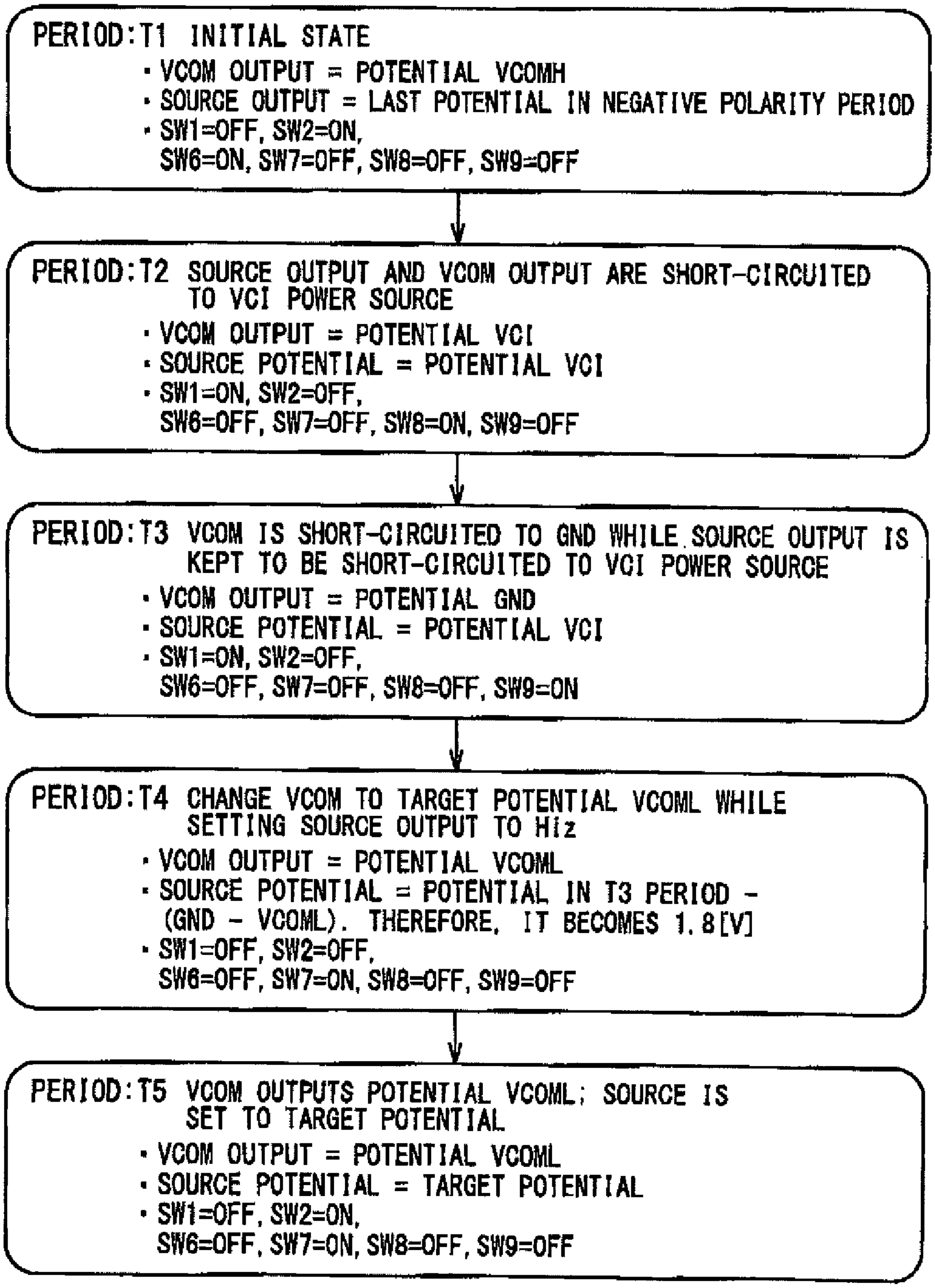
FIG. 8A is a flowchart showing an example of operations when pulling down the counter electrode of the liquid crystal display device according to a first embodiment from the potential VCOMH to the potential VCOML.

(1) A Case Where Counter Electrode VCOM is Pulled Down from Potential VCOMH to Potential VCOML FIG. 7A is a timing chart for describing an operation of the liquid crystal display device 1 when the polarity of the driving voltage is changed from negative to positive, i.e., when the counter electrode VCOM is pulled down from the potential VCOMH to the potential VCOML. FIG. 8A is a flowchart showing an operation of the liquid crystal display device 1 in each period. Explanations hereinafter will be provided assuming that the liquid crystal display device 1 is in an initial state in the period T1.

In the period T1, the counter electrode VCOM is pulled up to the potential VCOMH, and the source lines S1 to Sn are driven to the potential corresponding to the image data. For achieving black display, the source lines S1 to Sn are driven to a positive potential that is lower than the VCOMH and deviated from the potential VCOMH. In the meantime, for achieving white display, the source lines S1 to Sn are driven to a potential slightly higher than the potential VCOMH. In addition, the switches SW1, SW7 to SW9 are turned off, while the switches SW2 and SW6 are turned on. That is, the control signals S-SW1, S-SW7 to S-SW9 are negated, while the control signals S-SW2 and S-SW6 are asserted.

From the period T2, the operations for changing the polarity of the driving voltage from negative to positive are started. In the period T2, the source lines S1 to Sn and the counter electrode VCOM are short-circuited to the VCI power supply. More specifically, the control signals S-SW1, S-SW8 are asserted and the switches SW1, SW8 are turned on, while the switches SW2, SW6, SW7, and SW9 are turned off. With this, the source lines S1 to Sn are connected to the VCI power supply interconnection 27, and the counter electrode VCOM is connected to the VCI power supply interconnection 43. Thereby, the source lines S1 to Sn and the counter electrode VCOM are driven to the potential VCI. Note that the VCI power supply interconnection 27 and the VCI power supply interconnection 43 are both connected to the VCI power supply interconnection 30 electrically. With this operation, the electric charges of the source lines S1 to Sn and the counter electrode VCOM are simply redistributed through the VCI power supply interconnections 27 and 43, so that no power is consumed.

In the period T3 following the period T2, the counter electrode VCOM is pulled down to the ground potential VSS, while the source lines S1 to Sn are being connected to the VCI power supply. More specifically, the control signals S-SW1, S-SW9 are asserted, and the switches SW1, SW9 are turned on. The switches SW2, SW6, SW7, and SW8 are turned off. With this operation, the counter electrode VCOM is short-circuited to the ground interconnection 44, while the source lines S1 to Sn are being connected to the VCI power supply interconnection 27. This operation requires no electric charge for pulling down the counter electrode VCOM to the ground potential VSS, even though electric charge is consumed for keeping the source lines S1 to Sn to the potential VCI.

In the period T4 following the period T3, the counter electrode VCOM is pulled down to the potential VCOML, while the source lines S1 to Sn are kept to a high-impedance state. More specifically, the control signal S-SW7 is asserted and the switch SW7 is turned on, while the switches SW1, SW2, SW6, SW8, and SW9 are turned off. With this, the counter electrode VCOM is connected to the output of the VCOML output amplifier 42, and the counter electrode VCOM is pulled down to the potential VCOML. The potential of the source lines S1 to Sn is lowered because of the pull-down of the counter electrode VCOM. However, the change in the potential of the counter electrode VCOM is small, so that an amount of the change in the potential of the source lines S1 to Sn is also small. Thus, no electric charge is consumed in the period T4.

In the period T5 following the period T4, the source lines S1 to Sn are driven to the potential in accordance with the image data (different from that of the period T1), while the counter electrode VCOM is kept to the potential VCOML. More specifically, the control signals S-SW2, S-SW7 are asserted and the switches SW2, SW7 are turned on, while the switches SW1, SW6, SW8, and SW9 are turned off. With this, the source lines S1 to an are connected to the output amplifiers 25-1 to 25-*n*, and driven to the potential corresponding to the image data.

FIGS. 9 to 13 are illustrations for respectively showing examples of the state of the electric charges in the periods T1 to T5 in details. In the explanations using FIGS. 9 to 13, it is assumed that the potential VCOML is −1.0 [V], the potential VCOMH is +4.0 [V], and the potential VCI is 2.8 [V]. A possible range of the source line potential is assumed to be +0.5-4.5 [V]. Further, the factor that is most influential to the electric charges consumed when driving the counter electrode VCOM and the source lines S1 to Sn is the parasitic capacitance Csv between the counter electrode VCOM and the source lines S1 to Sn. Thus, the parasitic capacitance Cgv between the common electrode VCOM and the gate lines G1 to Gm, the liquid crystal pixel capacitance CI, and the storage capacitance Cst are neglected, since influences of those are insignificant. The parasitic capacitance Csv between each source line Sj and the counter electrode VCOM is assumed to be C [F]. Further, the LCD panel 2 is assumed to be a normally-white panel, and it is assumed that black display is performed on the LCD panel 2. That is, it is assumed that the source line Sj is driven to 0.5 V when the counter electrode VCOM is pulled up to the potential VCOMH (=4.0 [V]), and that the source line Sj is driven to 4.5 V when the counter electrode VCOM is pulled down to the potential VCOML (=−1.0 [V]).

Figure 9:
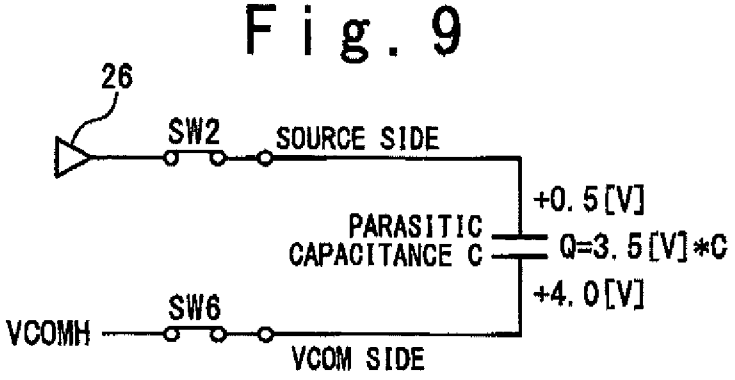
FIG. 9 is a conceptual illustration showing a state of electric charges accumulated in a source line and the counter electrode in a period T1 of the operation of FIG. 7A.

In the period T1 being the initial state, as shown in FIG. 9, the counter electrode VCOM is in the potential VCOMH (+4.0 [V]), and the potential of the source line Sj is 0.5 V. As a result, the electric charge of “3.5 [V]×C” is to be accumulated to the parasitic capacitance between the source line Sj and the counter electrode VCOM.

Figure 10:
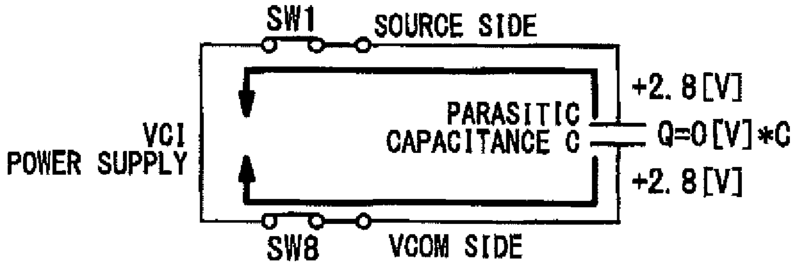
FIG. 10 is a conceptual illustration showing a state of electric charges accumulated in the source line and the counter electrode in a period T2 of the operation of FIG. 7A.

As shown in FIG. 10, in the period T2, the counter electrode VCOM and the source lines S1 to Sn are short-circuited to the VCI power supply. In this operation, the electric charges accumulated to the parasitic capacitance are simply transferred from the common electrode VCOM to the source lines S1 to Sn, so that no power is consumed in the VCI power supply. In the period T2, there is no electric charge accumulated in the parasitic capacitance between the source lines S1 to Sn and the counter electrode VCOM.

Figure 11:
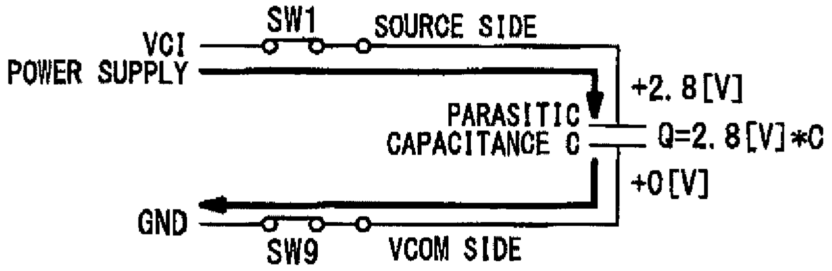
FIG. 11 is a conceptual illustration showing a state of electric charges accumulated in the source line and the counter electrode in a period T3 of the operation of FIG. 7A.

As shown in FIG. 11, in the period T3, the counter electrode VCOM is pulled down to the ground potential VSS, while the source lines S1 to Sn are connected to the VCI power supply. At this time, the VCI power supply supplies the electric charge corresponding to the change in the potential of the counter electrode (that is, electric charges of "2.8 [V]×C") to the source lines S1 to Sn in order to keep the source lines S1 to Sn to the potential VCI. That is, the electric charge consumed in the VCI power supply is "2.8 [V]×C". In the meantime, the counter electrode VCOM can be pulled down to the ground potential VSS by simply having the electric charge flown out to the ground interconnection 44, so that no electric charge is consumed in the VCI power supply. In the period T3, the electric charge accumulated in the parasitic capacitance between the source lines S1 to Sn and the counter electrode VCOM is "2.8 [V]×C". Thus, the electric charge of "2.8 [V]×C" is to be consumed in the period T3.

Figure 12:
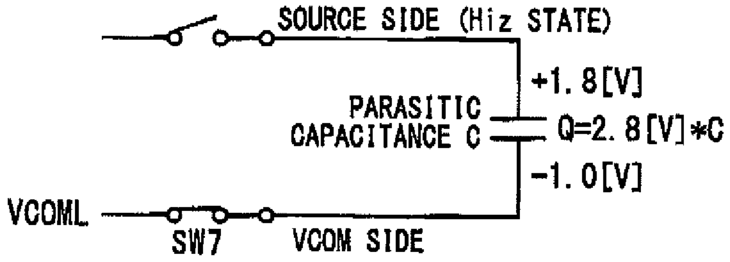
FIG. 12 is a conceptual illustration showing a state of electric charges accumulated in the source line and the counter electrode in a period T4 of the operation of FIG. 7A.

As shown in FIG. 12, in the period T4, the source lines S1 to Sn are driven to a high-impedance state. Further, the counter electrode VCOM is pulled down to the potential VCOML (=−1.0 [V]). In accordance with the pull-down of the counter electrode VCOM, the source lines S1 to Sn came to exhibit a same potential change as that of the counter electrode VCOM. Thereby, the source lines S1 to Sn are pulled down to 1.8[V]. The electric charges accumulated in the parasitic capacitance between the source lines S1 to Sn and the counter electrode VCOM are not transferred when pulling down the counter electrode VCOM to the potential VCOML. Thus, no electric charge is consumed in the VCI power supply.

Figure 13:
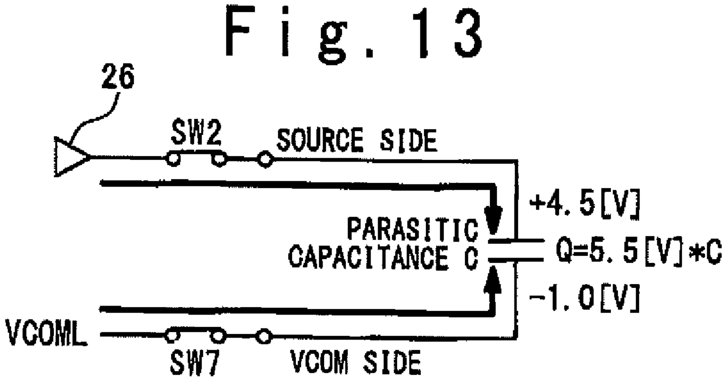
FIG. 13 is a conceptual illustration showing a state of electric charges accumulated in the source line and the counter electrode in a period T5 of the operation of FIG. 7A.

As shown in FIG. 13, in the period T5, the source lines S1 to Sn are pulled up to 4.5 V, while the counter electrode VCOM is kept to the potential VCOML (=−1.0 [V]). At this time, the electric charge of "2.7 [V]×C" is supplied from the VCI power supply to the source lines S1 to Sn in order to pull up the source lines S1 to Sn to 4.5 V. The source lines S1 to Sn are driven by the power supply voltage VS generated from the double boost-up power supply VDD2, so that the electric charge consumed in the VCI power supply is the electric charge of "5.4 [V]×C" that is twice as much. In addition, an electric charge corresponding to the change in the potential of the source lines S1 to Sn that is, electric charge of "2.7 [v]×C") is consumed in the VCOML output amplifier 42 in order to cancel the influence generated by the pull-up of the source lines S1 to Sn and to keep the counter electrode VCOM to −1.0 [V]. As a result, the electric charge consumed in the VCI power supply in the period T5 is "8.1 [V]×C".

Through the whole periods T1 to T5, the electric charge of "10.9 [V]×C" in total is consumed in the VCI power supply for providing black display. For displays of other colors, the electric charge consumption can also be calculated similarly.

FIG. 14 is a table showing the electric charges consumed for each display color when executing the driving method shown in FIGS. 7A and 8A. As described above, the electric charge of "10.9 [V]×C" in total is consumed in the VCI power supply for providing black display. Further, the electric charge of "4.1 [V]×C" in total is consumed in the VCI power supply for providing white display, and the electric charge of "4.9 [V]×C" in total is consumed in the VCI power supply for providing gray display. The advantages of the driving method shown in FIGS. 7A and 8A can be understood by comparing FIG. 14 with FIG. 5 which shows the electric charges consumed in a driving method according to the aforementioned reference technique. For performing black display in particular, it is possible with the driving method of this embodiment to reduce the electric charge consumption to "10.9 [V]×C", while the electric charge of "16.5 [V]×C" is consumed with the reference technique. The electric charge consumption can be reduced for other display colors as well. FIG. 38 shows a comparison table regarding the electric charge consumption and a consumption current. The consumption current is calculated assuming that capacitance C between the source lines S1 to Sn and the counter electrode VCOM is 100 pF, the number of gate lines G1 to Gm is 160, and the frame frequency is 60 Hz. For example, when the electric charge consumption is "10 [V]×C", it can be calculated as follows.

$$I=10000\ \text{pf}\times 10\ \text{V}\times 160\times 60=0.96\ \text{mA}$$

As shown in FIG. 38, the driving method of this embodiment can reduce the electric charge consumption by about 34% for a case of providing black display, and about 9% for the case of providing white display.

Figure 7B:
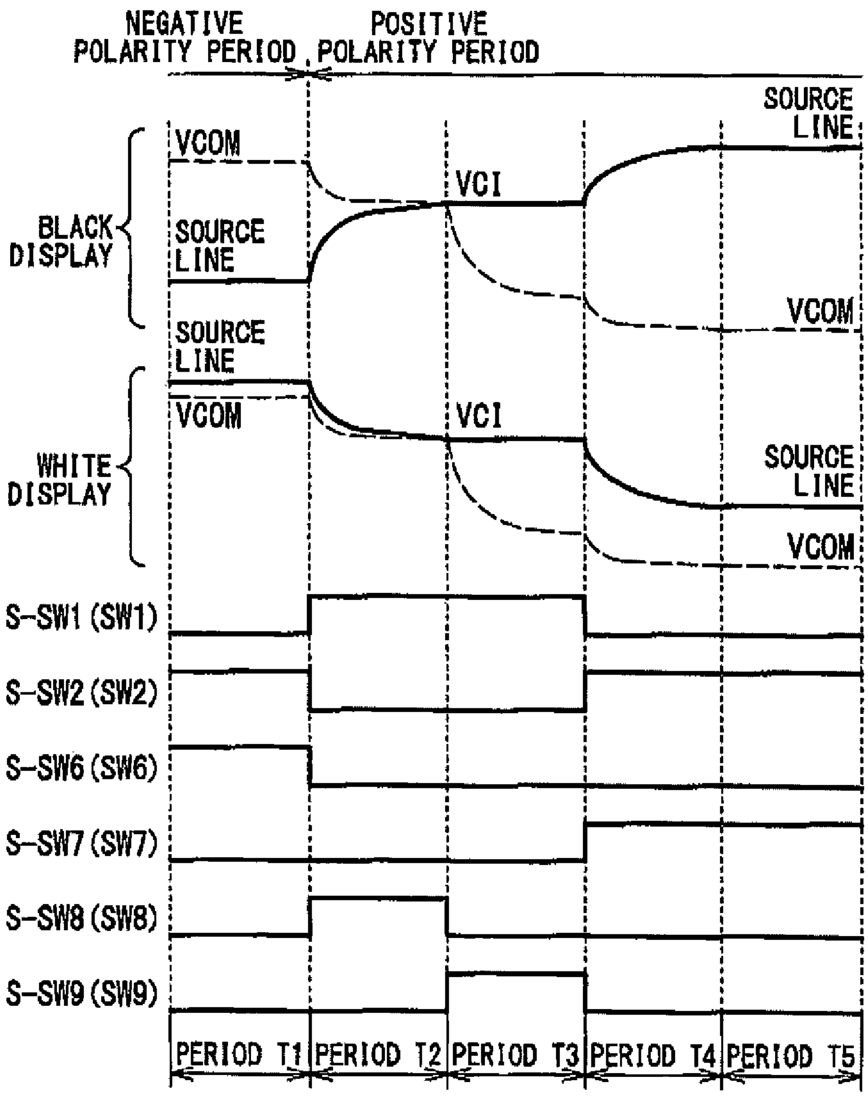
FIG. 7B is a timing chart showing another example of an operation when pulling down the counter electrode of the liquid crystal display device according to a first embodiment from the potential VCOMH to the potential VCOML.

In a first embodiment, pull-down of the counter electrode VCOM from the ground potential VSS to the potential VCOML and drive of the source lines S1 to Sn to the potential in response to the image data may be performed simultaneously. FIG. 7B is a timing chart for describing the operations of the liquid crystal display device 1 executed for such case, and FIG. 8B is a flowchart showing the operation of the liquid crystal display device 1 in each period of FIG. 7B.

The operations of the periods T1 to T3 shown in FIGS. 7B and 8B are the same as the operations shown in FIGS. 7A and 8A.

That is, in the period T1 where the liquid crystal display device 1 is in the initial state, the counter electrode VCOM is pulled up to the potential VCOMH, while the source lines S1 to Sn are driven to the potential corresponding to the image data. In addition, the switches SW1, SW7 to SW9 are turned off, while the switches SW2 and SW6 are turned on. That is, the control signals S-SW1, S-SW7 to S-SW9 are negated, and the control signals S-SW2, S-SW6 are asserted. The state of the electric charges in the period T1 of the operations shown in FIGS. 7B and 8B is the same as the state of the electric charges in the period T1 of the operations of FIGS. 7A and 8A shown in FIG. 9.

From the period T2, the operations for changing the polarity of the driving voltage from negative to positive are started. In the period T2, the source lines S1 to Sn and the counter electrode VCOM are short-circuited to the VCI power supply. More specifically, the control signals S-SW1, S-SW8 are asserted and the switches SW1, SW8 are turned on, while the switches SW2, SW6, SW7, and SW9 are turned off. With this, the source lines S1 to Sn are connected to the VCI power supply interconnection 27, and the counter electrode VCOM is connected to the VCI power supply interconnection 43. Thereby, the source lines S1 to Sn and the counter electrode VCOM are driven to the potential VCI. Note that the VCI power supply interconnection 27 and the VCI power supply interconnection 43 are electrically connected to each other. With this operation, the electric charges of the source lines S1 to Sn and the counter electrode VCOM are simply redistributed through the VCI power supply interconnections 27 and 43, so that no power is consumed. The state of the electric charges in the period T2 of the operations shown in FIGS. 7B and 8B is the same as the state of the electric charges in the period T2 of the operations of FIGS. 7A and 8A shown in FIG. 10.

In the period T3 following the period T2, the counter electrode VCOM is pulled down to the ground potential VSS, while the source lines S1 to Sn are being connected to the VCI power supply. More specifically, the control signals 5-SW1, S-SW9 are asserted and the switches SW1, SW9 are turned on, while the switches SW2, SW6, 5W7, and SW8 are turned off. With this operation, the counter electrode VCOM is, short-circuited to the ground interconnection 44, while the source lines S1 to Sn are being connected to the VCI power supply interconnection 27. This operation requires no electric charge for pulling down the counter electrode VCOM to the ground potential VSS, even though electric charge is consumed for keeping the source lines S1 to Sn to the potential VCI. The state of the electric charges in the period T3 of the operations shown in FIGS. 7B and 8B is the same as the state of the electric charges in the period T3 of the operations of FIGS. 7A and 8A shown in FIG. 11. When performing black display under the Same conditions shown in FIGS. 9 to 13 (the potential VCI is 2.8 V, the potential to which the source lines S1 to Sn are to be driven is 4.5 V, and the potential VCOML is −1.0 V), the electric charge of "2.8 [V]×C" is consumed in the period T3 for keeping the source lines S1 to Sn to the potential VCI.

In the period T4 following the period T3, the source lines S1 to Sn are driven to the potential corresponding to the image data, and the counter electrode VCOM is pulled down from the ground potential VSS to the potential VCOML. More specifically, the control signals S-SW2, S-SW7 are asserted and the switches SW2, SW7 are turned on, while the switches SW1, SW6, SW8, and SW9 are turned off. With this, the source lines S1 to Sn are connected to the output amplifiers 25-1 to 25-*n*, while the counter electrode VCOM is connected to the output of the VCOML output amplifier 42. At this time, in order to drive the source lines S1 to Sn to the potential corresponding to the image data, it is necessary to supply, to the source lines, the electric charges required for canceling the influence generated by the pull-down of the counter electrode VCOM from the ground potential VSS to the potential VCOML and driving the source lines S1 to Sn from the ground potential VCI to the potential corresponding to the image data. Thus, the electric charge of "2.7 [V]×C" is consumed for driving the source lines S1 to Sn, when performing black display under the same conditions as those shown in FIG. 9 to FIG. 13. More specifically, the electric charge of "1.0 V×C" is consumed for canceling the influence generated when pulling down the counter electrode VCOM from the ground potential VSS to the potential VCOML, and the electric charge of "1.7 [V]×C" is consumed for pulling up the source lines S1 to Sn from 2.8 V to 4.5 V. The source lines S1 to Sn are driven by the power supply voltage VS generated from the double boost-up power supply VDD2, so that the electric charge consumed in the VCI power supply is the electric charge of "5.4 [V]×C" that is twice as much. In the meantime, the electric charge Corresponding to the sum of the change in the potential of the source lines S1 to Sn and the change in the potential of the counter electrode VCOM (that is, electric charge of "2.7 [V]×C") is consumed in the VCOML output amplifier 42 in order to cancel the influence generated by the pull-up of the source lines S1 to Sn and to drive the counter electrode VCOM to −1.0 [V]. As a result, the electric charge consumed in the VCI power supply in the period T4 is "8.1 [V]×C".

As a result, the electric charge of "10.9 [V]×C" in total is consumed in the VCI power supply when performing black display by the operations of FIGS. 7B and 8B, similarly to the operations of FIGS. 7A and 8A.

For such operations, when driving the source lines S1 to Sn, there is required only a half the power since the influence generated by the pull-down of the counter electrode VCOM is cancelled while being short-circuited to the VCI power supply, without using the double boost-up power supply. Further, for driving the source lines S1 to Sn to the target potential thereafter, the power required for driving the source lines S1 to Sn can be reduced since the change in the potential is small.

Figure 15:
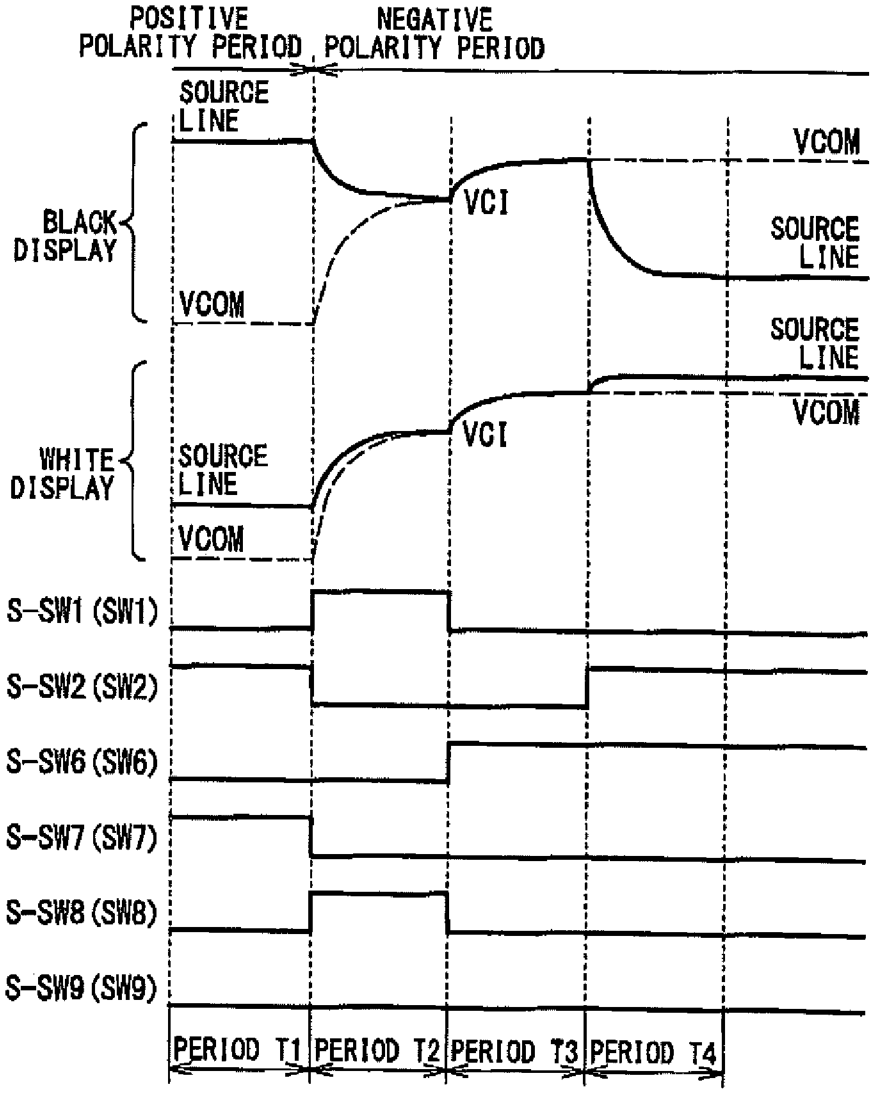
FIG. 15 is a timing chart showing an example of operations when pulling up the counter electrode of the liquid crystal display device according to a first embodiment from the potential VCOML to the potential VCOMH.

(2) Case Where Counter Electrode VCOM is Pulled Up from Potential VCOML to Potential VCOMH FIG. 15 is a timing chart for describing the operation of the liquid crystal display device 1 when changing the polarity of the driving voltage from positive to negative, i.e., when pulling up the counter electrode VCOM from the potential VCOML to the potential VCOMH. FIG. 16 is a flowchart showing the operation of the liquid crystal display device 1 in each period of FIG. 15. As will be described hereinafter, the counter electrode VCOM is pulled up from the potential VCOML to the potential VCOMH in the liquid crystal display device 1 of a present embodiment by a driving method different from that of a liquid crystal device of the aforementioned reference technique, because of the difference between the structures of those devices. However, with the driving method explained below, there is no increase generated in the power consumption at least. Explanations hereinafter will be provided assuming that the liquid crystal display device 1 is in the initial state in the period T1.

In the period T1, the counter electrode VCOM is pulled down to the potential VCOML, and the source lines S1 to Sn are driven to the potential corresponding to the image data. For achieving black display, the source lines S1 to Sn are driven to a positive potential that is higher than the VCOML and deviated from the potential VCOML. In the meantime, for achieving white display, the source lines S1 to Sn are driven to a potential slightly higher than the potential VCOML. In addition, the switches SW1, SW6, SW8, and SW9 are turned off, while the switches SW2 and SW7 are turned on. That is, the control signals S-SW1, S-SW6, S-SW8, and S-SW9 are negated, while the control signals S-SW2 and S-SW7 are asserted.

From the period T2, the operations for changing the polarity of the driving voltage from positive to negative are started. In the period T2, the source lines S1 to Sn and the counter electrode VCOM are short-circuited to the VCI power supply. More specifically, the control signals S-SW1, S-SW8 are asserted and the switches SW1, SW8 are turned on, while the switches SW2, SW6, SW7, and SW9 are turned off. With this, the source lines S1 to 5*n* are connected to the VCI power supply interconnection 27, and the counter electrode VCOM is connected to the VCI power supply interconnection 43. Thereby, the source lines S1 to Sn and the counter electrode VCOM are driven to the potential VCI. Note that the VCI power supply interconnection 27 and the VCI power supply interconnection 43 are electrically connected to each other. With this operation, the electric charges of the source lines S1 to Sn and the counter electrode VCOM are simply redistributed through the VCI power supply interconnections 27 and 43, so that no power is consumed.

In the period T3 following the period T2, the counter electrode VCOM is pulled up to the potential VCOMH, while the source lines S1 to Sn are in the high-impedance state. More specifically, the control signal S-SW6 is asserted and the switch SW6 is turned on, while the switches SW1, SW2, and SW7 to SW9 are turned off. With this, the counter electrode VCOM is connected to the output of the VCOMH output amplifier 41, and the counter electrode VCOM is pulled up to the potential VCOMH. The potential of the source lines S1 to Sn is boosted up because of the pull-up of the counter electrode VCOM. However, the change in the potential of the counter electrode VCOM is small, so that an amount of change in the potential of the source lines S1 to Sn is also small. Thus, no electric charge is consumed.

In the period T4 following the period T3, the source line S1 to Sn are driven to the potential corresponding to the image data, while the counter electrode VCOM is kept to the potential VCOMH. More specifically, the control signals S-SW2, S-SW6 are asserted and the switches SW2, SW6 are turned on, while the switches SW1, and SW7 to SW9 are turned off. With this, the source lines S1 to Sn are connected to the output amplifiers 25-1 to 25-*n*, and driven to a potential corresponding to the image data.

FIGS. 17 to 20 are illustrations for respectively showing examples of a state of the electric charges in the periods T1 to T4 in details. In the explanations using FIGS. 17 to 20, the same conditional assumptions as those of the explanations provided with FIGS. 9 to 13 are employed. That is, it is assumed that the potential VCI is −1.0 [V], the potential −VCOMH is +4.0 [V], and the potential VCI is 2.8 [V]. Further, the possible range of the source line potential is assumed to be +0.5-4.5 [V]. Furthermore, the LCD panel 2 is assumed to be a normally-white panel, and it is assumed that black display is performed on the LCD panel 2.

Figure 17:
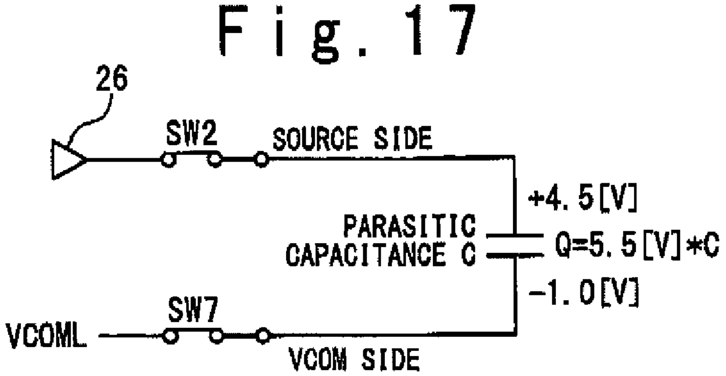
FIG. 17 is a conceptual illustration showing a state of electric charges accumulated in the source line and the counter electrode in a period T1 of the operations of FIG. 15.

As shown in FIG. 17, the potential of the counter electrode VCOM is the potential VCOML (−1.0 [V]) and the potential of the source lines S1 to Sn is 4.5 V in the period T1 that is in the initial state. As a result, the electric charge of "5.5 [V]×C" is accumulated to the parasitic capacitance between the source lines S1 to Sn and the counter electrode VCOM.

Figure 18:
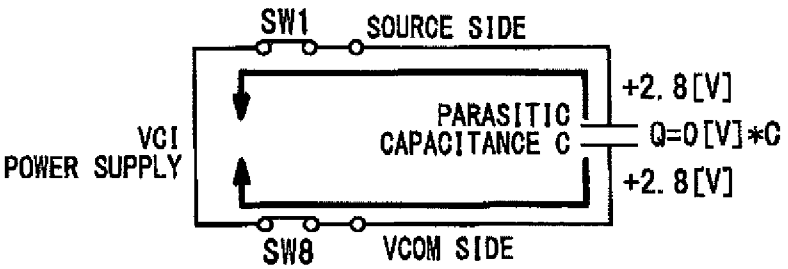
FIG. 18 is a conceptual illustration showing a state of electric charges accumulated in the source line and the counter electrode in a period T2 of the operations of FIG. 15.

As shown in FIG. 18, the counter electrode VCOM and the source lines S1 to Sn are short-circuited to the VCI power supply in the period T2. In this operation, no power is consumed in the VCI power supply since the electric charges are canceled by short-circuiting both ends of the parasitic capacitance. In the period T2, there is no electric charge accumulated in the parasitic capacitance between the source lines S1 to Sn and the counter electrode VCOM.

Figure 19:
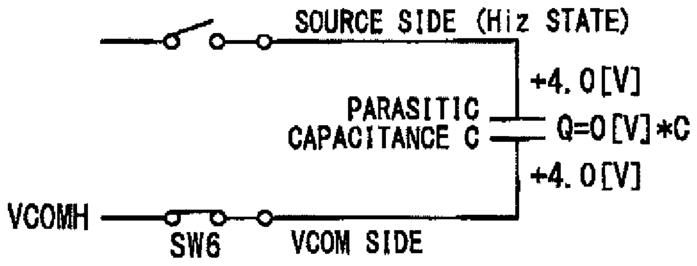
FIG. 19 is a conceptual illustration showing a state of electric charges accumulated in the source line and the counter electrode in a period T3 of the operations of FIG. 15.

As shown in FIG. 19, in the period T3, the source lines S1 to Sn are driven to the high-impedance state. Further, the counter electrode VCOM is pulled up to the potential VCOMH (=+4.0 [V]). The electric charges accumulated in the parasitic capacitance between the source lines S1 to Sn and the counter electrode VCOM are not transferred when pulling up the counter electrode VCOM to the potential VCOMH. Thus, no electric charge is consumed in the VCI power supply.

Figure 20:
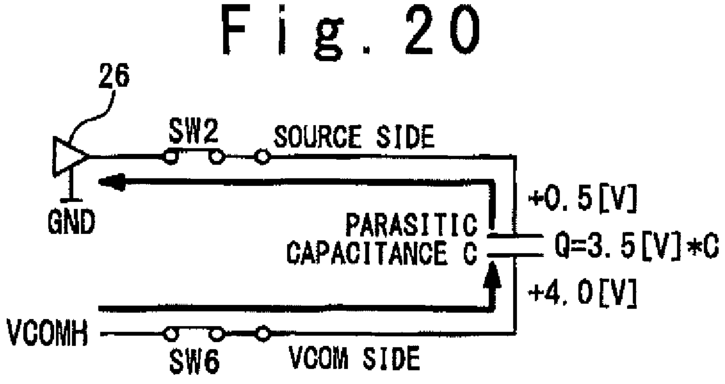
FIG. 20 is a conceptual illustration showing a state of electric charges accumulated in the source line and the counter electrode in a period T4 of the operations of FIG. 15.

As shown in FIG. 20, in the period T4, the source lines S1 to Sn are pulled down to 0.5 V, while the counter electrode VCOM is kept to the potential VCOMH (=+4 [V]). At this time, the source lines S1 to Sn are pulled down by having the electric charges discharged from the source lines S1 to Sn to the ground potential via the output amplifier 25. Thus, no power is consumed for pulling down the source lines S1 to Sn. In the meantime, the VCOMH output amplifier 41 supplies the electric charge corresponding to the change in the potential of the source lines S1 to Sn (that is, the electric charge of "3.5 [V]×C") to the counter electrode VCOM in order to cancel the influence of the pull-down of the source lines S1 to Sn and to keep the counter electrode VCOM to +4.0 [V]. The VCOMH output amplifier 41 is driven by the power supply voltage VCOMH that is generated from the double boost-up power supply voltage VDD2, so that the electric charge consumed in the VCI power supply is "7.0 [V]×C" that is twice as much. As a result, the electric charge consumed in the VCI power supply in the period T3 is "7.0 [V]×C".

Through the whole periods T1 to T4, the electric charge of "7.0 [V]×C" in total is consumed in the VCI power supply for providing black display. For displays of other colors, the electric charge consumption can be calculated similarly.

FIG. 21 is a table showing the electric charges consumed for each display color when executing the driving method shown in FIGS. 15 and 16. As described above, the electric charge of "7.0 [V]×C" in total is consumed in the VCI power supply for providing black display. Further, the electric charge of "1.0 V×C" in total is consumed in the VCI power supply for providing white display, and the electric charge of "3.0 [V]×C" in total is consumed in the VCI power supply for providing gray display. It can be understood by comparing FIG. 21 with FIG. 14 that it is possible with the driving method of FIGS. 15 and 16 to pull up the counter electrode VCOM from the potential VCOML to the potential VCOMH without increasing the power consumption at least.

Figure 22:
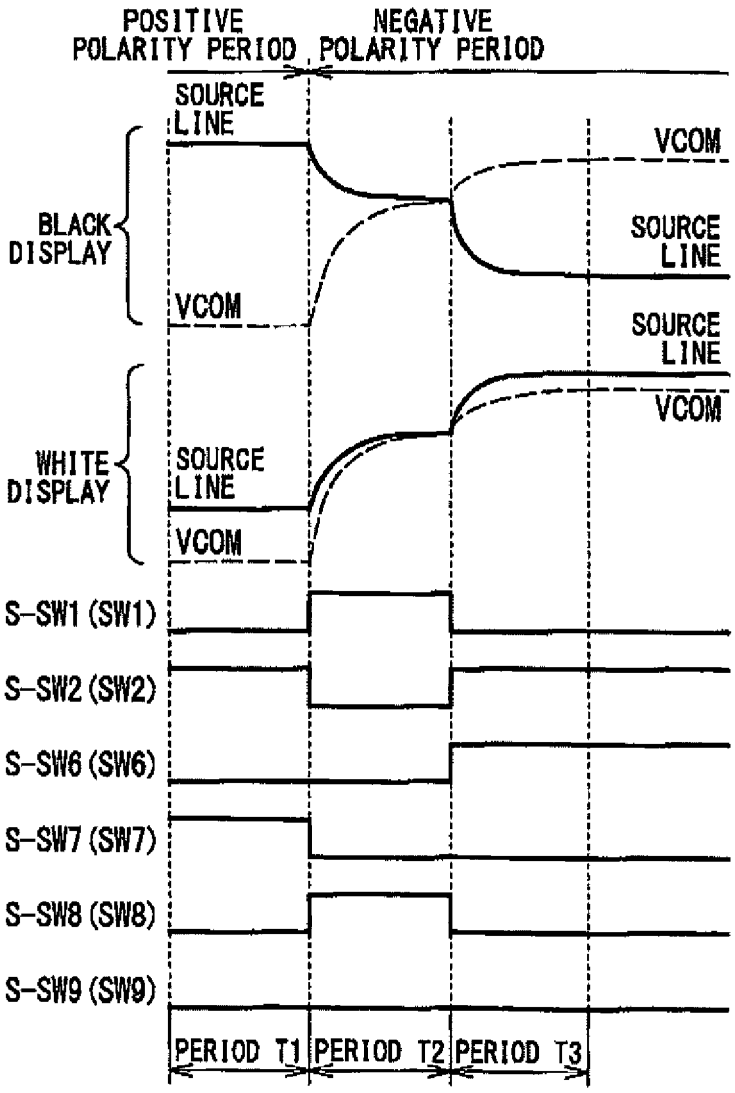
FIG. 22 is a timing chart showing another example of operations when pulling up the counter electrode of the liquid crystal display device according to a first embodiment from the potential VCOML, to the potential VCOMH.

For the operation to change the polarity of the driving voltage from positive to negative, it is also possible to employ other procedures. FIG. 22 is a timing chart for describing another example of the operations executed by the liquid crystal display device 1 when changing the polarity of the driving voltage from positive to negative (that is, when pulling up the counter electrode VCOM from the potential VCOML to the potential VCOMH), and FIG. 23 is a flowchart for describing the operation of the liquid crystal display device 1 executed in each period. A difference between the operations of FIGS. 22 and 23 and the operations of FIGS. 15 and 16 is that the counter electrode VCOM and the source lines S1 to Sn are driven simultaneously in the operations of FIGS. 22 and 23. Detailed explanations will be provided hereinafter.

The operations in the periods T1 and T2 of FIGS. 22 and 23 are the same as those shown in FIGS. 15 and 16. That is, in the period T1 where the liquid crystal display device 1 is in the initial state, the counter electrode VCOM is pulled down to the potential VCOML, while the source lines S1 to Sn are driven to the potential corresponding to the image data. In addition, the switches SW1, SW6, SW8, and SW9 are turned off, while the switches SW2 and SW7 are turned on. That is, the control signals S-SW1, S-SW6, S-SW8, S-SW9 are negated, and the control signals S-SW2, S-SW7 are asserted. The state of the electric charges in the period T1 of the operations shown in FIGS. 22 and 23 is the same as the state of the electric charges in the period T1 of the operations of FIGS. 15 and 16 shown in FIG. 18.

From the period T2, the operations for changing the polarity of the driving voltage from positive to negative are started. In the period T2, the source lines S1 to Sn and the counter electrode VCOM axe short-circuited to the VCI power supply. More specifically, the control signals S-SW1, S-SW8 are asserted and the switches SW1, SW8 are turned on, while the switches SW2, SW6, SW7, and SW9 are turned off. With this, the source lines S1 to Sn are connected to the VCI power supply interconnection 27, and the counter electrode VCOM is connected to the VCI power supply interconnection 43. Thereby, the source lines S1 to Sn and the counter electrode VCOM are driven to the potential VCI. Note that the VCI power supply interconnection 27 and the VCI power supply interconnection 43 are electrically connected to each other. With this operation, the electric charges of the source lines S1 to Sn and the counter electrode VCOM are simply redistributed through the VCI power supply interconnections 27 and 43, so that no additional electric charge is consumed. The state of the electric charges in the period T2 of the operations shown in FIGS. 22 and 23 is the same as the state of the electric charges in the period T2 of the operations of FIGS. 15 and 16 shown in FIG. 18.

In the period T3 following the period T2, the source lines S1 to Sn are driven to the potential corresponding to the image data, and the counter electrode VCOM is pulled up to the potential VCOMH at the same time. More specifically, the control signals S-SW2, S-SW6 are asserted and the switches SW2, SW6 are turned on, while the switches SW1, SW7 to SW9 are turned off. With this, the source lines S1 to Sn are connected to the output amplifiers 25-1 to 25-*n*, while the counter electrode VCOM is connected to the output of the VCOMH output amplifier 41. When it is assumed that the potential VCOML is −1.0 [V], the potential VCOMH is +4.0 [V], the potential VCI is 2.8 [V], and the possible range of the source line potential is +0.5-4.5[V], the state of the electric charges in the period T3 of the operations shown in FIGS. 22 and 23 is the same as the state of the electric charges in the period T4 of the operations of FIGS. 15 and 16 shown in FIG. 20. In the period T3, the source lines S1 to Sn are driven to 0.5 V by having the electric charges flown out from the source lines S1 to Sn to the ground potential via the output amplifier 25. Thus, no electric charge is consumed for driving the source lines S1 to Sn. In the meantime, the VCOMH output amplifier 41 supplies the electric charge of "3.5 [V]×C" to the counter electrode VCOM for pulling up the counter electrode VCOM from +2.8 [V] to +4.0 [V]. It is supposed that the counter electrode VCOM can be driven by simply supplying the electric charge required for pulling up the counter electrode by 1.2 [V] (that is, the electric charge of "1.2 [V]×C"), if there is no influence generated by the pull-down of the source lines S1 to Sn. However, in order to cancel the influence generated by pulling down the source lines S1 to Sn from 2.8 [V] to 0.5 [V], it is necessary to additionally supply the electric charge of "2.3 [V]×C" that corresponds to the change in the potential of the source lines S1 to Sn. The VCOMH output amplifier 41 is driven by the power supply voltage VCOMH that is generated from the double boost-up power supply voltage VDD2, so that the electric charge consumed in the VCI power supply is "7.0 [V]×C" that is twice as much. As a result, the electric charge consumed in the VCI power supply in the period T3 is "7.0 [V]×C".

As a result, as shown in FIG. 24, the power consumed with the driving method of FIGS. 22 and 23 is the same as the power consumed with the driving method executed by the operations of FIGS. 15 and 16, i.e., same as the power consumed with a driving method of the reference technique. At least, there is no increase in the power consumption caused by employing the driving method of FIGS. 22 and 23.

Second Embodiment

Figure 25:
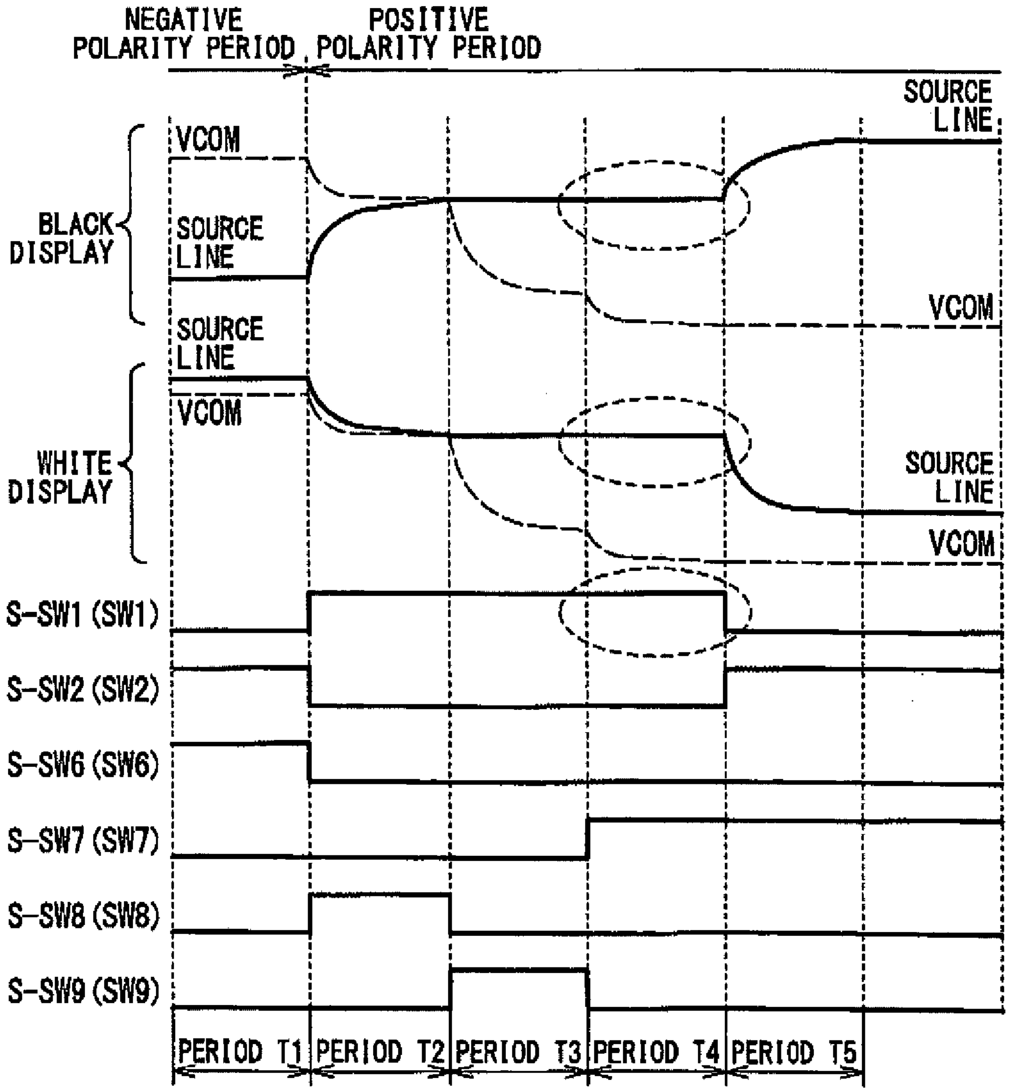
FIG. 25 is a timing chart showing an example of operations when pulling down a counter electrode of a liquid crystal display device according to a second embodiment from the potential VCOMH to the potential VCOML.
Figure 26:
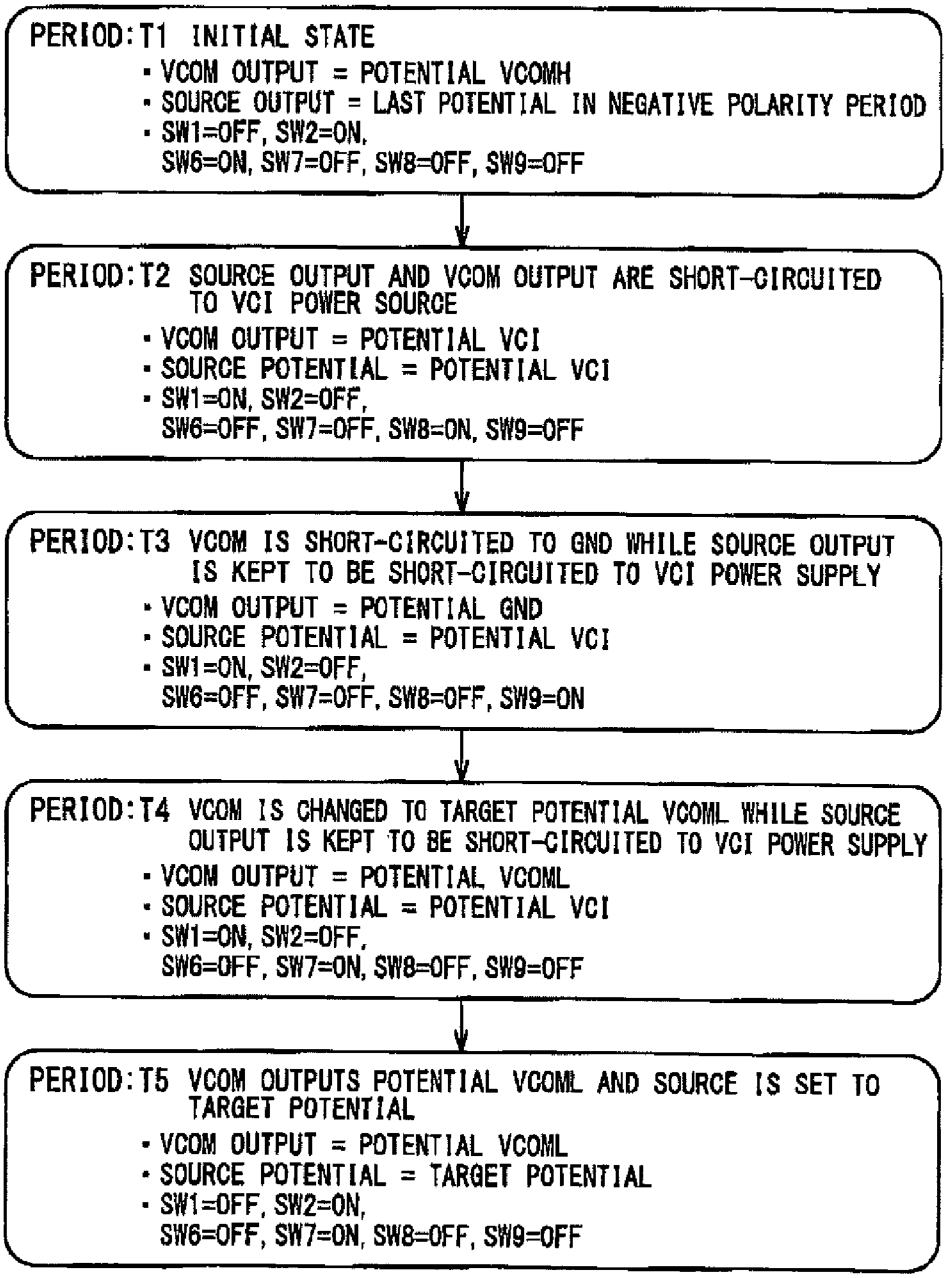
FIG. 26 is a flowchart showing an example of operations when pulling down the counter electrode of a liquid crystal display device according to a second embodiment from the potential VCOMH to the potential VCOML.

FIG. 25 is a timing chart for describing operations of the liquid crystal display device 1 according to a second embodiment when changing the polarity of the driving voltage from negative to positive, i.e., when pulling down the counter electrode VCOM from the potential VCOMH to the potential VCOML. FIG. 26 is a flowchart showing the operation of the liquid crystal display device 1 in each period. In a second embodiment, the counter electrode VCOM is pulled down to the potential VCOML by a procedure different from that of a first embodiment.

More specifically, the operations regarding the periods T1 to T3 of a second embodiment shown in FIGS. 25 and 26 are the same as the operations of a first embodiment shown in FIGS. 7A and 8A. In the period T1 under the initial state, the counter electrode VCOM is pulled up to the potential VCOMH, while the source lines S1 to Sn are driven to the potential corresponding to the image data. In the period T2 following the period T1, the source lines S1 to Sn and the counter electrode VCOM are short-circuited to the VCI power supply. As described in a first embodiment, no electric charge is consumed in the periods T1 and T2. In the period T3 following the period T2, the counter electrode VCOM is pulled down to the ground potential VSS, while the source lines S1 to Sn are being connected to the VCI power supply. Under the same conditions shown in FIG. 9 to FIG. 13, the electric charge of "2.8 [V]×C" is consumed in the period T3 for keeping the source lines S1 to Sn to the potential VCI.

In the meantime, the operations of the period T4 and thereafter according to a second embodiment are different from those of a first embodiment. More specifically, in the period T4, the counter electrode VCOM is pulled down from the ground potential VSS to the potential VCOML, while the source lines S1 to Sn are being connected to the VCI power supply. More specifically, the control signals S-SW1, S-SW7 are asserted and the switches SW1, SW7 are turned on, while the switches SW2, SW6, SW8, and SW9 are turned off. With this, the counter electrode VCOM is connected to the output of the VCOML output amplifier 42 and pulled down to the potential VCOML, while the source lines S1 to Sn are being connected to the VCI power supply interconnection 27.

Figure 27:
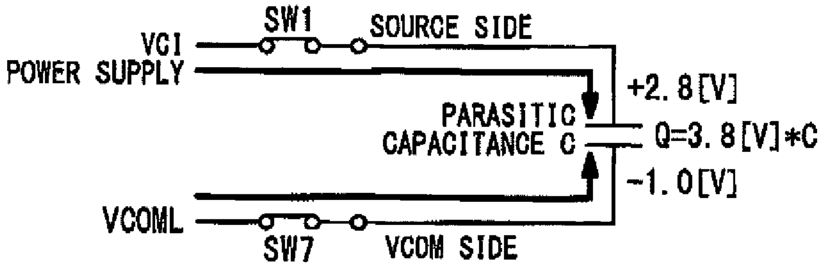
FIG. 27 is a conceptual illustration showing the state of electric charges accumulated in the source line and the counter electrode in the period T4 of the operations shown in FIG. 25.

FIG. 27 is a conceptual illustration showing a state of electric charges accumulated in the period T4. In FIG. 27, it is assumed that the potential VCOML is −1.0 [V], the potential VCOMH is +4.0 [V], the potential VCI is 2.8 [V], and the possible range of the source line potential is +0.5 to 4.5 [V].

In the period T4, the electric charge of "1.0 [V]×C" is consumed in the VCOML output amplifier 42 because the counter electrode VCOM is pulled down from the ground potential VSS to the potential VCOML. Further, due to the influence caused by the pull-down of the counter electrode VCOM from the ground potential VSS to the potential VCOML, the electric charge corresponding to the change in the potential of the counter electrode VCOM (that is, the electric charge of "1.0 [V]×C") is supplied to the source lines S1 to Sn and consumed therein, in order to keep the source lines S1 to Sn to the potential VCI. Therefore, the electric charge of "2.0 V×C" in total is to be consumed in the period T4.

In the period T5 following the period T4, the source line S1 to Sn are driven to the potential corresponding to the image data, while the counter electrode VCOM is kept to the potential VCOML. More specifically, the control signals S-SW2, S-SW7 are asserted and the switches SW2, SW7 are turned on, while the switches SW1, SW6, SW8, and SW9 are turned off. With this, the source lines S1 to Sn are connected to the output amplifiers 25-1 to 25-*n*, and driven to the potential according to the image data.

A state of the electric charges in the period T5 is the same as that of the period T5 of a first embodiment shown in FIG. 13. In the period T5, the electric charge of "1.7 [V]×C" is supplied from the VCI power supply to the source lines S1 to Sn in order to pull up the source lines S1 to Sn from 2.8 V to 4.5 V. The source lines S1 to Sn are driven by the power supply voltage VS generated from the double boost-up power supply VDD2, so that the electric charge consumed in the VCI power supply is "3.4 [V]×C" that is twice as much. In addition, the electric charge corresponding to the change in the potential of the source lines S1 to Sn (that is, electric charge of "1.7 [V]×C") is consumed in the VCOML output amplifier 42 in order to cancel the influence caused by the pull-up of the source lines S1 to Sn and to keep the counter electrode VCOM to −1.0 [V]. As a result, the electric charge consumed in the VCI power supply in the period T5 is "5.1 [V]×C".

Through the whole periods T1 to T5, the electric charge of "9, 9 [V]×C" in total is consumed in the VCI power supply for providing black display. For displays of other colors, the electric charge consumption can also be calculated similarly.

FIG. 28 is a table showing the electric charges consumed for each display color when executing the driving method shown in FIGS. 25 and 26. As described above, the electric charge of "9.9 [V]×C" in total is consumed in the VCI power supply for providing black display. Further, the electric charge of "7.1 [V]×C" in total is consumed in the VCI power supply for providing white display, and the electric charge of "5.1 [V]×C" in total is consumed in the VCI power supply for providing gray display. Advantages of the driving method shown in FIGS. 25 and 26 can be understood by comparing FIG. 28 with FIG. 5 which shows the electric charges consumed with a driving method according to the reference technique. For performing black display, it is possible with the driving method of a second embodiment to reduce the electric charge consumption to "9.9 [V]×C", while the electric charge of "16.5 [V]×C" is consumed with the reference technique. FIG. 38 shows a comparison table regarding the electric charge consumption.

Third Embodiment

By comparing the electric charges consumed in the operations of a first embodiment for changing the polarity of the driving voltage from negative to positive, i.e., the electric charges consumed in the operations for pulling down the counter electrode VCOM to the potential VCOML (see FIG. 14), with the electric charges consumed by the same operations of a second embodiment (see FIG. 28), it can be understood that for performing white display, the electric charge consumption is smaller in a first embodiment; and for performing black display, it is smaller in a second embodiment. Therefore, it is possible to reduce the electric charge consumption by changing, in accordance with the values of image data, the operation of the period T4 where the counter electrode VCOM is pulled down from the ground potential VSS to the potential VCOML.

More specifically, as shown in FIGS. 7A and 8A of a first embodiment, the source line Sj providing white display (that is, the source line Sj that is driven to a potential relatively close to the potential VCOML) is set to be in the high-impedance state in the period T4 where the counter electrode VCOM is pulled down from the ground potential VSS to the potential VCOML. In the meantime, as shown in FIGS. 25 and 26 of a second embodiment, the source line Sj providing black display (that is, the source line Sj that is driven to a potential relatively deviated from the potential VCOML) is continuously connected to the VCI power supply in the period T4.

Figure 29:
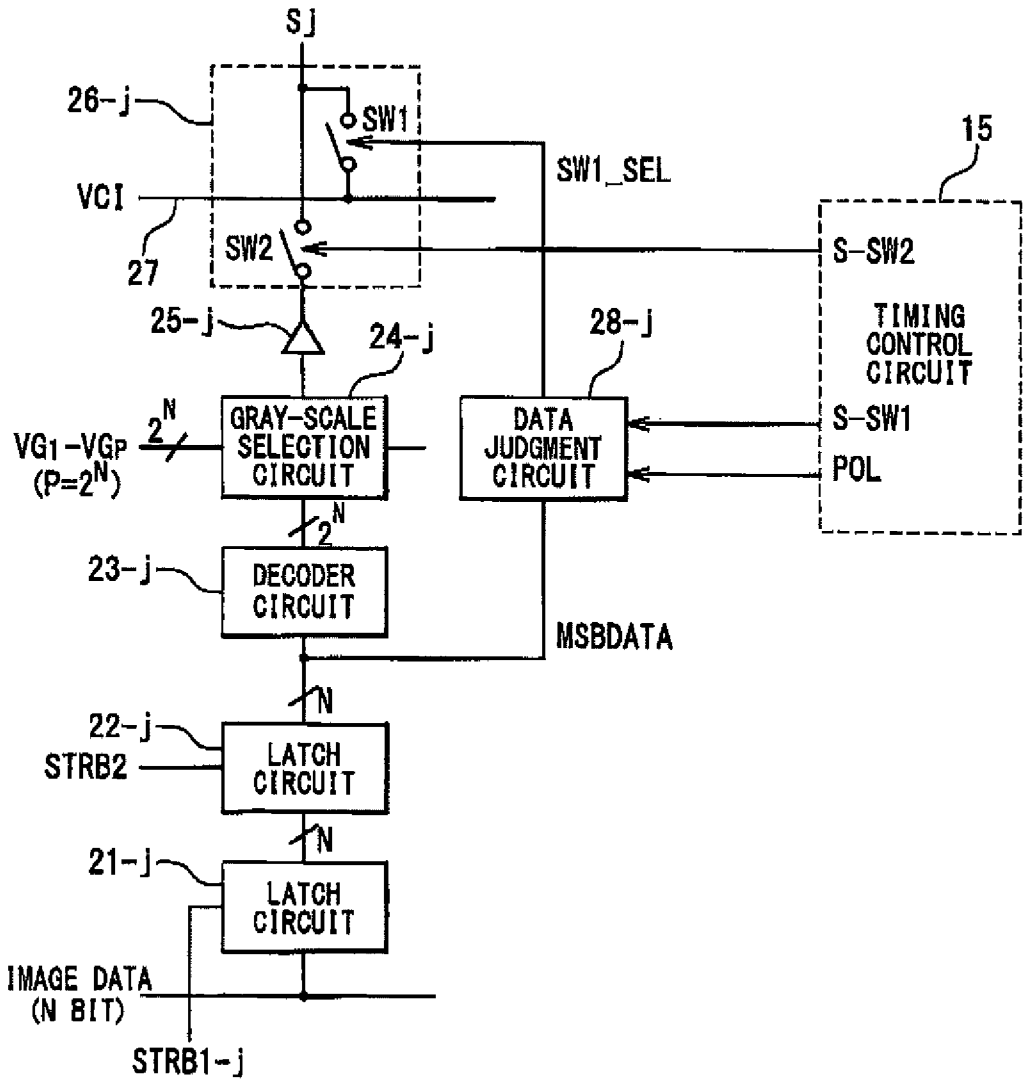
FIG. 29 is a block diagram showing a structure of a source driver circuit of an LCD driver according to a third embodiment.

FIG. 29 is a block diagram showing an example of a structure of the source driver circuit 12 that makes it possible to achieve such operations. FIG. 29 shows the circuit structure of a part of the source driver circuit 12, which corresponds to a single source line Sj. As can be understood by comparing it with the structure of the source driver circuit 12 of a first embodiment shown in FIG. 6C, a data judging circuit 28-*j* for controlling the switch SW1 in accordance with the value of the image data is provided in a third embodiment. More specifically, the polarity signal POL for designating the polarity of the driving voltage and the control signal S-SW1 are supplied to the data judging circuit 28-*j* from the timing control circuit 15, and the highest order bit of the image data, "MSBDATA", is supplied to the data judging circuit 28-*j* from the latch circuit 22-*j*. Note that the control signal S-SW1 is asserted in the period T4, as in the case of a second embodiment. The data judging circuit 28-*j* generates a control signal SW1_SEL for controlling the switch SW1 of the output control circuit 26-*j*, from the polarity signal POL, the control signal S-SW1, and a highest order bit MSBDATA.

FIG. 30 is a true-value table showing an operation of the data judging circuit 28-*j*. The true-value table of FIG. 30 shows logic behaviors of a case where black-based display is performed on a normally-white panel, when the gray-scale selection circuit 24-*j* selects a potential deviated from the counter electrode VCOM (that is, black display is performed on the source line Sj), provided that the polarity signal POL for designating the polarity of the driving voltage to be positive is "0" and the value of the image data is large (that is, the highest order bit MSBDATA is "1"). Inversely, a logic operation when the highest order bit of the image data, "MSBDATA", is "0" is executed when performing white-based display.

When the polarity of the driving voltage is changed from negative to positive (that is, when the polarity signal POL is set as "0", and the counter electrode VCOM is pulled down from the potential VCOMH to the potential VCOML), the control signal SW1_SEL is controlled in accordance with the highest order bit MSBDATA in the period T4. More specifically, in the period T4, when the highest order bit MSBDATA is "0" (that is, white display is performed on the source line Sj), the data judging circuit 28-*j* sets the control signal SW1_SEL as "0" to turn off the switch SW1, even though the control signal SW1 is "1" (that is, "High" level). In the period T4, the switch SW2 is also turned off. As a result, the source line Sj is set to be in the high-impedance state. In the meantime, when the highest order bit MSBDATA is "1" (that is, black display is performed on the source line Sj), the control signal SW1_SEL is set as "1" to turn on the switch SW1. By turning on the switch SW1, the source line Sj is connected to the VCI power supply interconnection 27 and short-circuited to the VCI power supply.

In the meantime, when the polarity of the driving voltage is changed from positive to negative (that is, when the polarity signal POL is set as "1", and the counter electrode VCOM is pulled up from the potential VCOML to the potential VCOMH), the data judging circuit 28-*j* sets the value of the control signal SW1 to be consistent with the value of the control signal SW1_SEL regardless of the highest order bit MSBDATA.

In the operations of FIG. 30, the control signal SW1_SEL is generated by responding only to the highest order bit of the image data, so that the operation for driving the source line Sj to an intermediate potential may not be optimum. It becomes possible to execute the operation with more reduced power consumption, through generating the control signal SW1_SEL by responding to a plurality of bits of the image data. However, the structure of generating the control signal SW1_SEL by responding only to the highest order bit is effective for reducing the circuit scale of the data judging circuit 28-*j*.

As described, in the liquid crystal display device 1 of a third embodiment, each source line is short-circuited to the VCI power supply or set to be in the high-impedance sate in accordance with the image data. With this, the power consumption can be reduced further.

Fourth Embodiment

Figure 31A:
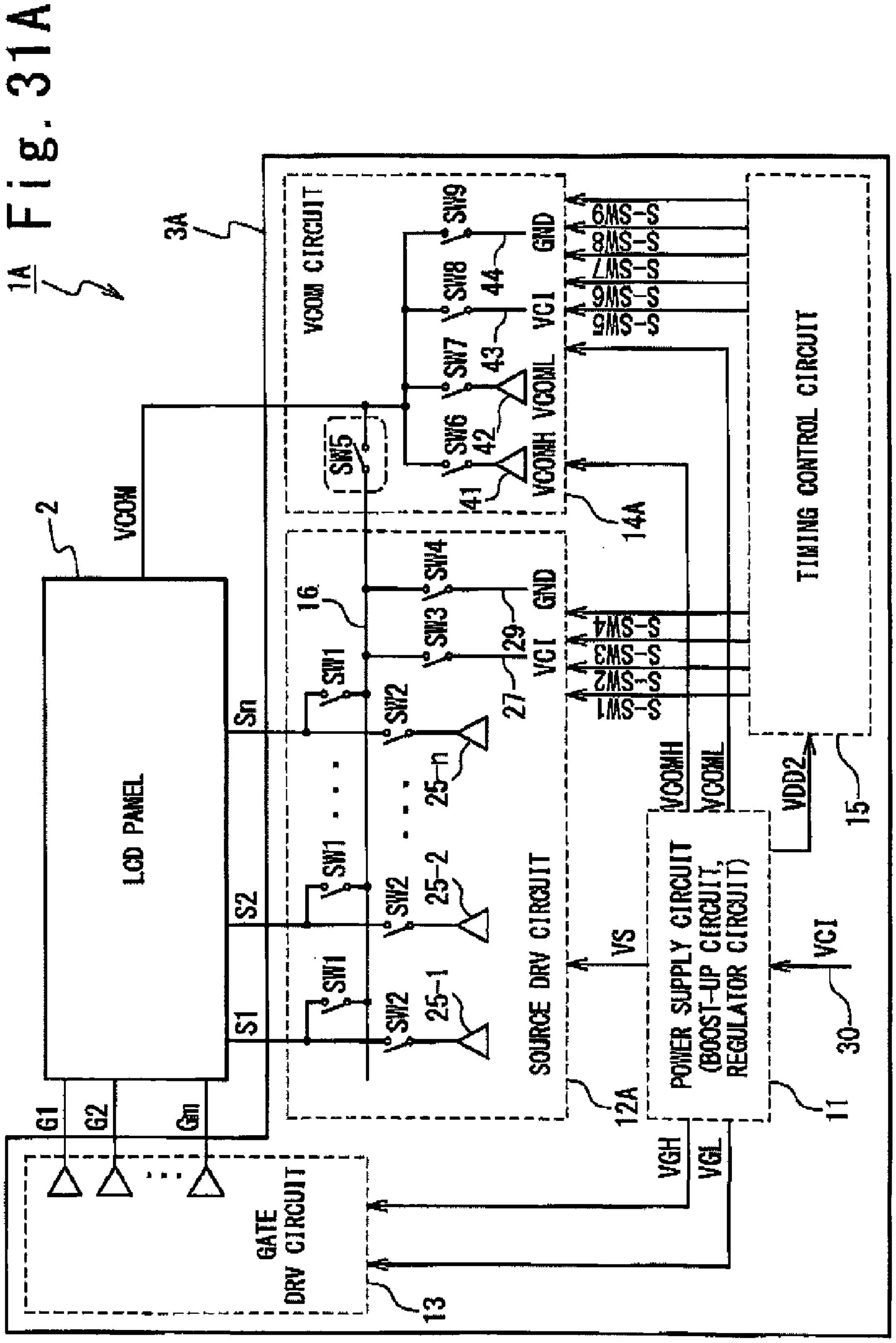
FIG. 31A is a block diagram showing a structure of a liquid crystal display device according to a fourth embodiment of the present invention.

FIG. 31A is a block diagram showing a structure of a liquid crystal display device 1A according to a fourth embodiment.

The liquid crystal display device 1 of a fourth embodiment has almost a same structure as that of the liquid crystal display device of a first embodiment shown in FIG. 6A, except for following aspects.

First, a common interconnection 16 having a low impedance (that is, the interconnection width thereof is large), switches SW3 and SW4, and a ground interconnection 29 are added to a source driver circuit 12A of an LCD driver 3A. The switch SW1 is provided between the common interconnection 16 and the output of the source driver circuit 12, the switch SW3 is provided between the common interconnection 16 and the VC1 power supply interconnection 27, and the switch SW4 is provided between the common interconnection 16 and the ground interconnection 29. For controlling the switches SW3 and SW4, control signals S-SW3 and S-SW4 are supplied to the source driver circuit 12A from the timing control circuit 15.

Secondly, a switch SW5 is provided to a VCOM circuit 14A. The switch SW5 is connected between the output of the VCOM circuit 14A and the common interconnection 16 of the source driver circuit 12A. For controlling the switch SW5, a control signal S-SW5 is supplied to the VCOM circuit 14A from the timing control circuit 15.

The Switch SW5 provided to the VCOM circuit 14A functions to provide a path for directly short-circuiting the source lines S1 to sn to the counter electrode VCOM. In a first embodiment, the source lines S1 to Sn and the counter electrode VCOM are all connected to the VCI power supply to be electrically short-circuited. With such structure, however, the impedance of the path through which the electric charges transfer becomes increased, so that time for the source lines S1 to Sn and the counter electrode VCOM to be stabilized to the potential VCI may become extended. With the structure of this embodiment, the source lines S1 to Sn and the counter electrode VCOM can be connected via a short path by turning on the switch SW5. Therefore, the time for stabilizing the source lines S1 to Sn and the counter electrode VCOM to the potential VCI can be shortened.

The switches SW3 and SW4 are capable of setting the source lines S1 to Sn not only to the potential VCI but also to the ground potential VSS. The source lines S1 to Sn can be set to the potential VCI by turning on the switches SW1 and SW3 while turning off the switch SW4. Further, the source lines S1 to Sn can be set to the ground potential VSS by turning on the switches SW1 and SW4 while turning of the switch SW3. To set the source lines S1 to Sn to the ground potential VSS is effective when stopping a display operation of the liquid crystal display device 1A without having a residual image. It is preferable to release the electric charges remained in the pixels of the LCD panel 2 to the ground in order to stop the display operation of the liquid crystal display device 1A without having a residual image. It becomes possible to release the electric charges remained in the pixels of the LCD panel 2 to the ground and stop the display operation of the liquid crystal display device 1A without having a residual image, through scanning the gate lines G1 to Gm by turning on the switches SW1 and SW4.

The structure having the VCI power supply interconnection 27 and the ground interconnection 29 connected to the common interconnection 16 via the switches SW3 and SW4 is preferable, since it is possible to connect the output terminals (that is, the source lines S1 to Sn) of the source driver circuit 12A to the VCI power supply interconnection 27 and the ground interconnection 29 electrically without increasing the circuit scale of the source driver circuit 12. It is true that a structure having individual switches for connecting the VCI power supply interconnection 27 and the ground interconnection 29 to each of the output terminals of the source driver circuit 12A can also be employed. However, with such structure, the number of switches is increased, and a plurality of thick interconnections are required for distributing the potential VCI and the ground potential with a low impedance. Therefore, the area of the source driver circuit 12A becomes enlarged. The structure of an embodiment can set the source lines to the potential VCI and the ground potential VSS by using a single thick interconnection with a low impedance (specifically, the common interconnection 16), so that the enlargement of the area can be suppressed.

Basically, the operations of the liquid crystal display device 1A of a fourth embodiment are almost the same as those of the liquid crystal display device 1 of a first embodiment. The main difference is that the switch SW5 is turned on in a fourth embodiment when short-circuiting the source lines S1 to Sn and the counter electrode VCOM to the VCI power supply. Hereinafter, the operations of the liquid crystal display device 1A of a fourth embodiment will be described in details.

Figure 32:
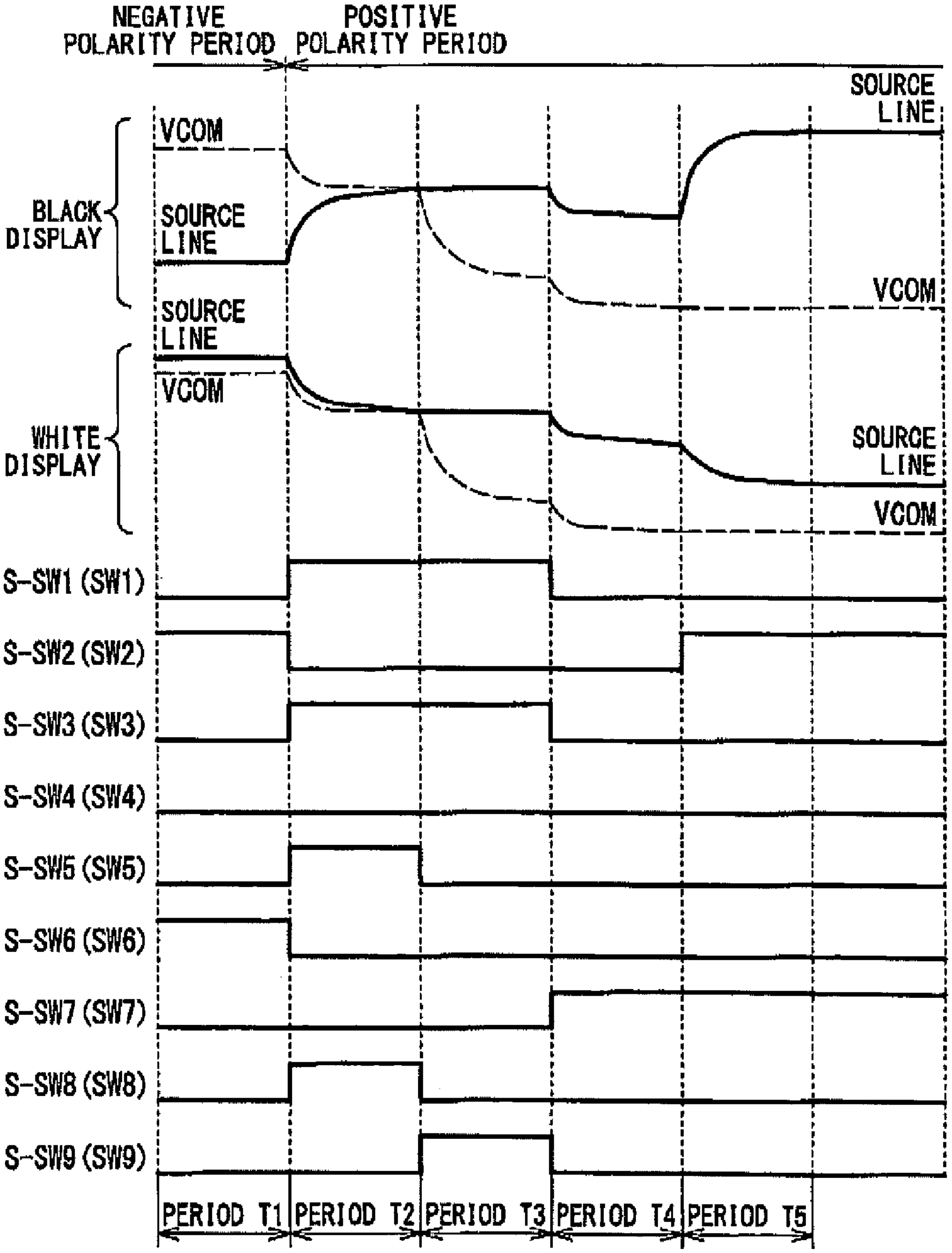
FIG. 32 is a timing chart showing an example of operations when pulling down a counter electrode of the liquid crystal display device according to a fourth embodiment from the potential VCOMH to the potential VCOML.
Figure 33:
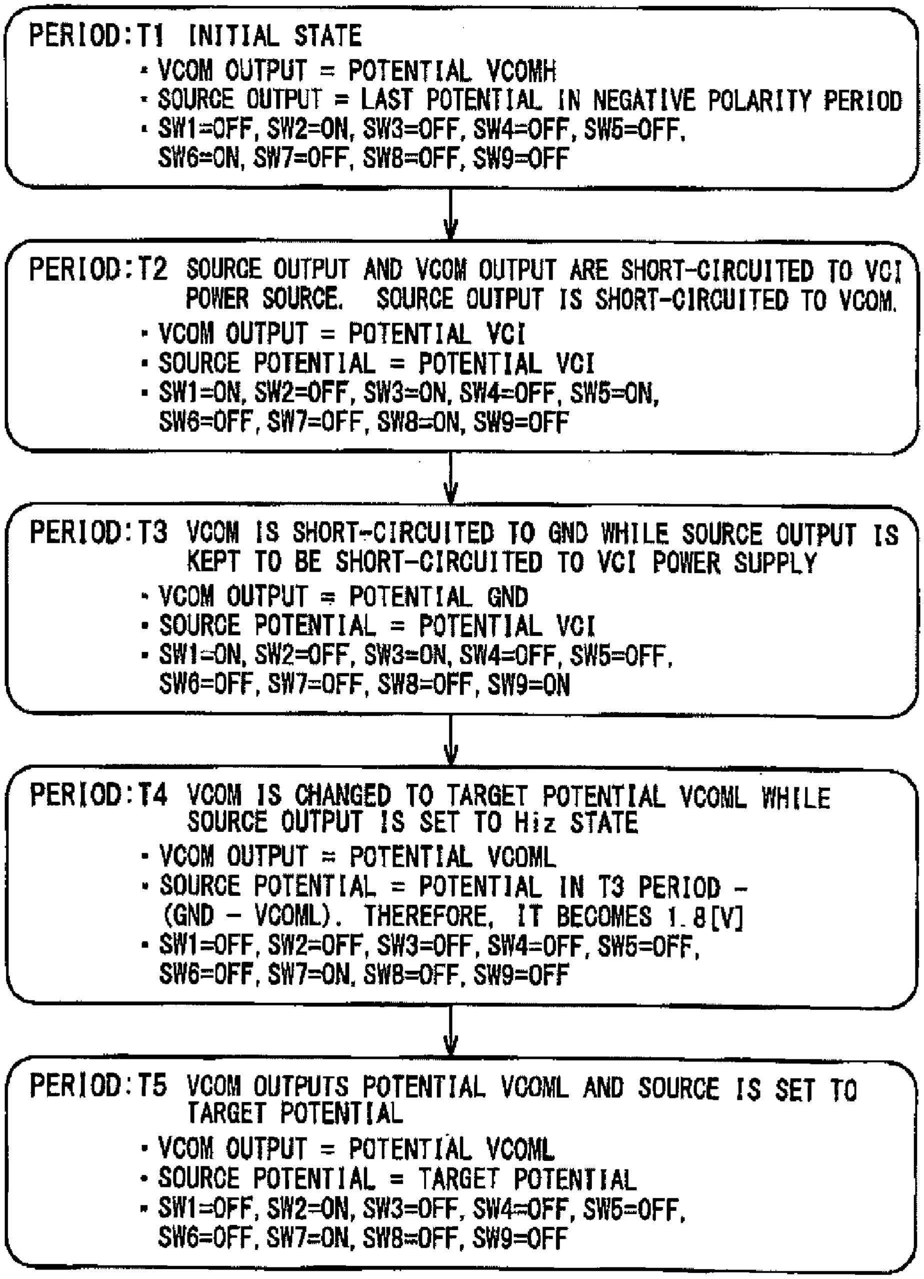
FIG. 33 is a flowchart showing an example of operations when pulling down the counter electrode of the liquid crystal display device according to a fourth embodiment from the potential VCOMH to the potential VCOML.

FIG. 32 is a timing chart for describing the operation of the liquid crystal display device 1A when changing the polarity of the driving voltage from negative to positive (i.e., when pulling down the counter electrode VCOM from the potential VCOMH to the potential VCOML). FIG. 33 is a flowchart showing the operation of the liquid crystal display device 1A in each period. Explanations hereinafter will be provided assuming that the liquid crystal display device 1 is in the initial state in the period T1.

In the period T1, the counter electrode VCOM is pulled up to the potential VCOMH, and the source lines S1 to Sn are driven to the potential corresponding to the image data. In addition, the switches SW1, SW3 to SW5, SW7 to SW9 are turned off, while the switches SW2 and SW6 are turned on. That is, the control signals S-SW1, S-SW3 to SW-5, S-SW7 to SW9 are negated, while the control signals S-SW2 and S-SW6 are asserted.

From the period T2, an operation for changing the polarity of the driving voltage from negative to positive are started. In the period T2, the source lines S1 to Sn and the counter electrode VCOM are short-circuited to the VCI power supply. Note that, in a present embodiment, the switch SW5 is turned on, and the source lines S1 to Sn and the counter electrode VCOM are short-circuited via the switch SW5 for short-circuiting the source lines S1 to Sn and the counter electrode VCOM to the VCI power supply. As described above, to have the switch SW5 turned on is effective for connecting the source lines S1 to Sn and the counter electrode VCOM via a short path and for shortening a time for stabilizing the source lines S1 to Sn and the counter electrode VCOM to the potential VCI.

More specifically, the control signals S-SW1, S-SW3, S-SW5, S-SW8 are asserted and the switches SW1, SW3, SW5, SW8 are turned on, while the switches SW2, SW4, SW6, SW7, SW9 are turned off. With this, the source lines S1 to Sn are connected to the VCI power supply interconnection 27, and the counter electrode VCOM is connected to the VCI power supply interconnection 43. In addition, the common interconnection 16 and an output of a VCOM circuit 14B are short-circuited, and the source lines S1 to Sn and the counter electrode VCOM are driven to the potential VCI. With this operation, the electric charges of the source lines S1 to Sn and the counter electrode VCOM are simply redistributed through the VCI power supply interconnections 27 and 43 and the switch SW5, so that no power is consumed.

In the period T3 following the period T2, the counter electrode VCOM is pulled down to the ground potential VSS, while the source lines S1 to Sn are being connected to the VCI power supply. More specifically, the control signals S-SW1, S-SW3, S-SW9 are asserted and the switches SW1, SW3, SW9 are turned on, while the switches SW2, SW4, SW5, SW6, SW7, and SW8 are turned off. With this operation, the counter electrode VCOM is short-circuited to the ground interconnection 44, while the source lines S1 to Sn are being connected to the VCI power supply interconnection 27. This operations requires no electric charge for pulling down the counter electrode VCOM to the ground potential VSS, even though electric Charges are consumed for keeping the source lines S1 to Sn to the potential VCI.

In the period T4 following the period T3, the counter electrode VCOM is pulled down to the potential VCOML, while the source lines S1 to Sn are in the high-impedance state. More specifically, the control signal S-SW7 is asserted and the switch SW7 is turned on, while the switches SW1 to SW6, SW8, and SW9 are turned off. With this, the counter electrode VCOM is connected to the output of the VCOML output amplifier 42, and the counter electrode VCOM is pulled down to the potential VCOML.

In the period T5 following the period T4, the source lines S1 to Sn are driven to the potential corresponding to the image data, while the counter electrode VCOM is kept to the potential VCOML. More specifically, the control signals S-SW2, S-SW7 are asserted and the switches SW2, SW7 are turned on, while the switches SW1, SW3 to SW6, SW8, and SW9 are turned off. With this, the source lines S1 to Sn are connected to the output amplifiers 25-1 to 25-*n*, and driven to a potential corresponding to the image data.

The electric charge consumed by the operations for pulling down the counter electrode VCOM to the potential VCOML through the above-described procedure is the same as the electric charge consumed by the operation of a first embodiment. With the liquid crystal display device 1A of a fourth embodiment, it is also possible to reduce the power consumption when pulling down the counter electrode VCOM from the potential VCOMH to the potential VCOML.

Figure 34:
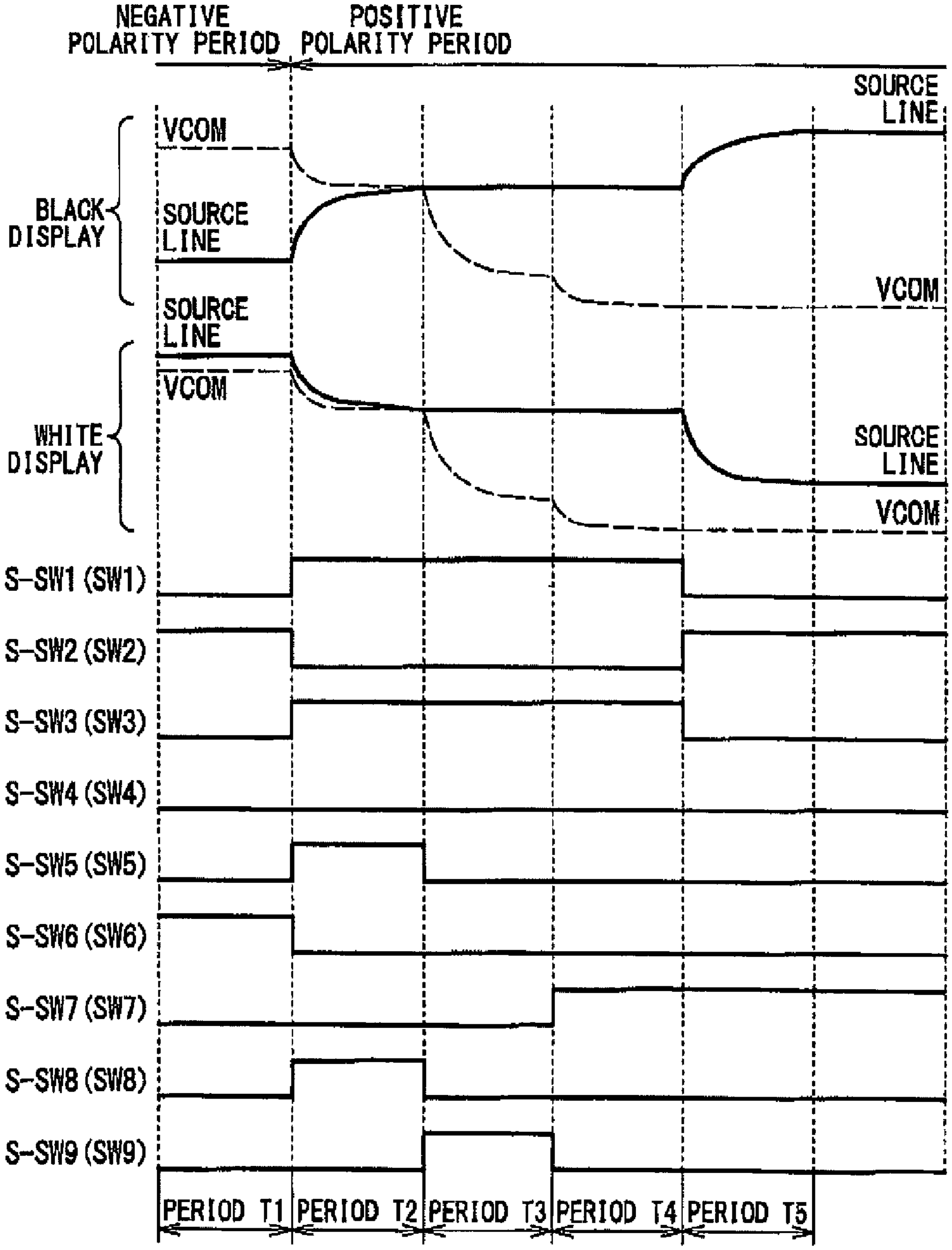
FIG. 34 is a timing chart showing another example of operations when pulling down the counter electrode of the liquid crystal display device according to a fourth embodiment from the potential VCOMH to the potential VCOML.
Figure 35:
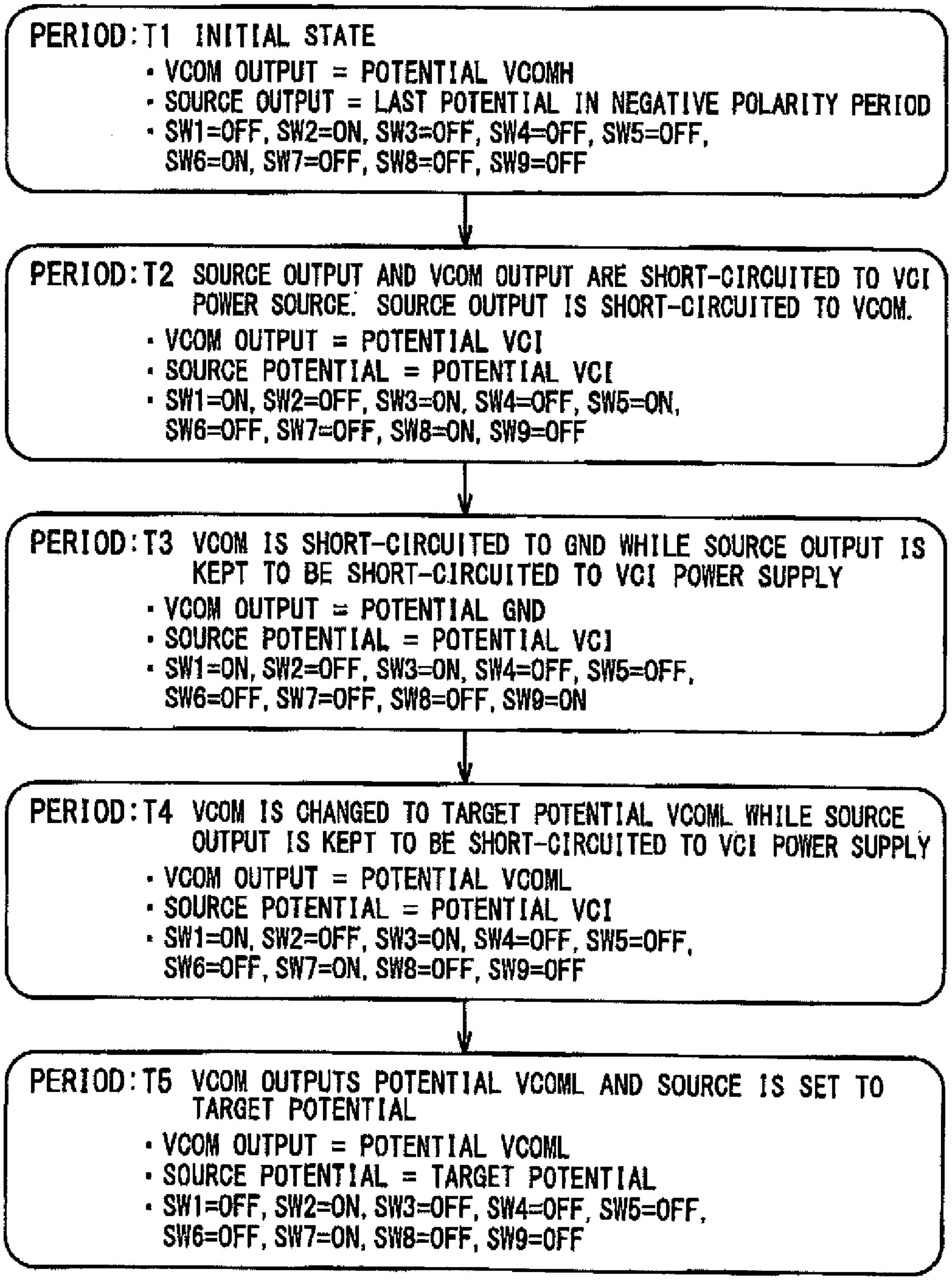
FIG. 35 is a flowchart showing another example of operations when pulling down the counter electrode of the liquid crystal display device according to a fourth embodiment from the potential VCOMH to the potential VCOML.

With the liquid crystal display device 1A of a fourth embodiment, the counter electrode VCOM may also be pulled down to the potential VCOML in the period T4 while having the source lines S1 to Sn short-circuited to the VCI power supply (as in the case of a second embodiment). FIG. 34 is a timing chart for describing the operations of the liquid crystal display device 1A of a fourth embodiment, when short-circuiting the source lines 81 to Sn to the VCI power supply in the period T4. FIG. 35 is a flowchart showing the operations of the liquid crystal display device 1A in each period.

In the period T4 of the operations shown in FIGS. 34 and 35, the control signals S-SW1, S-SW3, S-SW7 are asserted and the switch SW7 are turned on, while the switches SW2, SW4 SW6, SW8, and SW9 are turned off. With this, the counter electrode VCOM is connected to the output of the VCOML output amplifier 42 and pulled down to the potential VCOML, while the source lines S1 to Sn are being connected to the potential VCI. As described in a second embodiment, these operations make it possible to reduce the power consumption when providing black display.

In addition, as in the case of a third embodiment, whether to set each source line Sj to the high-impedance state or to have it short-circuited to the VCI power supply in the period T4 may also be determined in accordance with the image data in a fourth embodiment.

Figure 36:
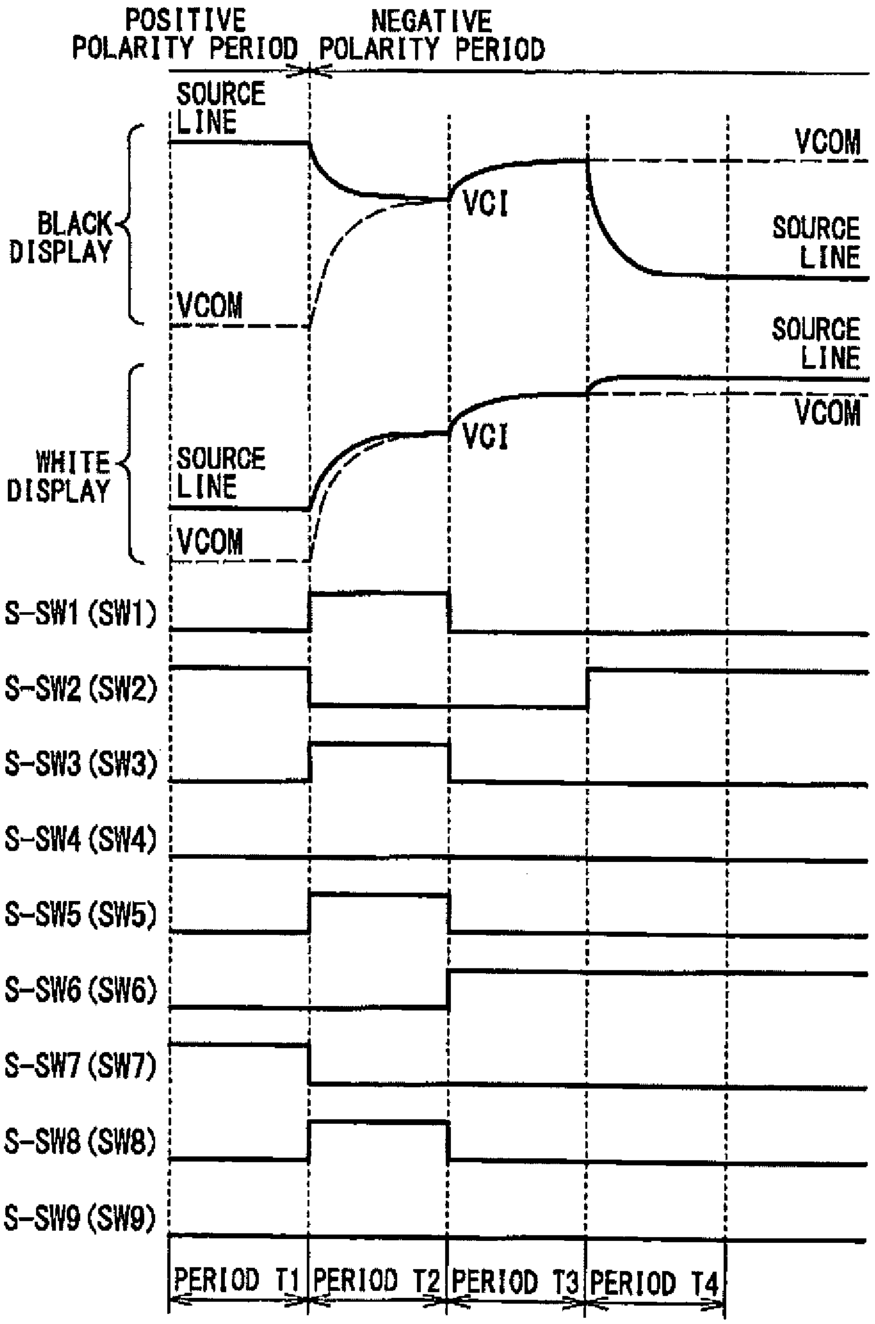
FIG. 36 is a timing chart showing an example of operations when pulling up the counter electrode of the liquid crystal display device according to a fourth embodiment from the potential VCOML to the potential VCOMH.
Figure 37:
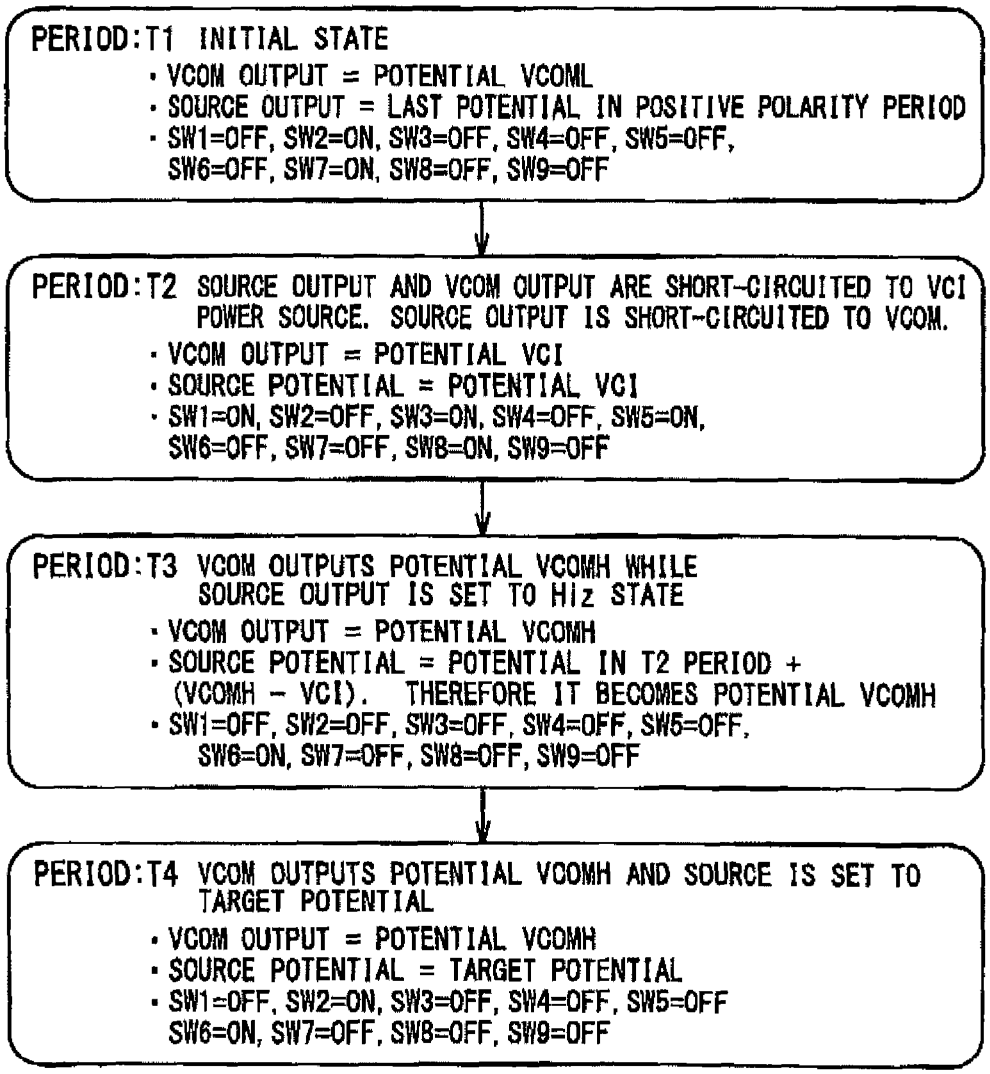
FIG. 37 is a flowchart showing another example of operations when pulling up the counter electrode of the liquid crystal display device according to a fourth embodiment from the potential VCOML to the potential VCOMH.

FIG. 36 is a timing chart for describing the operation of the liquid crystal display device 1A when changing the polarity of the driving voltage from positive to negative (i.e., when pulling up the counter electrode VCOM from the potential VCOML to the potential VCOMH). FIG. 37 is a flowchart showing the operations of the liquid crystal display device 1A in each period.

In the period T1, the counter electrode VCOM is pulled down to the potential VCOML, and the source lines S1 to Sn are driven to the potential corresponding to the image data. In addition, the switches SW1, SW3 to SW6, SW8, and SW9 are turned off, while the switches SW2 and SW7 are turned on. That is, the control signals S-SW1, S-SW3 to S-SW6, S-SW8, and S-SW9 are negated, while the control signals S-SW2 and S-SW7 are asserted.

From the period T2, the operation for changing the polarity of the driving voltage from positive to negative is started. In the period T2, the source lines S1 to Sn and the counter electrode VCOM are short-circuited to the VCI power supply. Note that when the source lines S1 to Sn and the counter electrode VCOM are short-circuited to the VCI power supply in a present embodiment, the switch SW5 is turned on so that the source lines S1 to Sn and the counter electrode VCOM are short-circuited via the switch SW5.

More specifically, the control signals S-SW1, S-SW3, S-SW5, S-SW8 are asserted and the switches SW1, SW3, SW5, SW8 are turned on, while the switches SW2, 5W4, SW6, SW7, and SW9 are turned off. With this, the source lines S1 to Sn are connected to the VCI power supply interconnection 27, and the counter electrode VCOM is connected to the VCI power supply interconnection 43. In addition, the common interconnection 16 is short-circuited to the output of the VCOM circuit 14B. Thereby, the source lines S1 to Sn and the counter electrode VCOM are driven to the potential VCI. With this operation, the electric charges of the source lines S1 to Sn and the counter electrode VCOM are simply redistributed through the VCI power supply interconnections 27, 43, and the switch SW5, so that no power is consumed.

In the period T3 following the period T2, the counter electrode VCOM is pulled up to the potential VCOMH, while the source lines S1 to Sn are in the high-impedance state. More specifically, the control signal S-SW6 is asserted and the switch SW6 is turned on, while the switches SW1 to SW5 and SW7 to SW9 are turned off. With this, the counter electrode VCOM is connected to the output of the VCOMH output amplifier 41, and the counter electrode VCOM is pulled up to the potential VCOMH. The potential of the source lines S1 to Sn is boosted up because of the pull-up of the counter electrode VCOM. However, the change in the potential of the counter electrode VCOM is small, so that the amount of the change in the potential of the source lines S1 to Sn is also small. Thus, no electric charge is consumed in the period T3.

In the period T4 following the period T3, the source lines S1 to Sn are driven to the potential corresponding to the image data, while the counter electrode VCOM is kept to the potential VCOMH. More specifically, the control signals S-SW2, S-SW6 are asserted and the switches SW2, SW6 are turned on, while the switches SW1, SW3 to SW5, and SW7 to SW9 are turned off. With this, the source lines S1 to Sn are connected to the output amplifiers 25-1 to 25-*n*, and driven to the potential corresponding to the image data.

With such driving method, the counter electrode VCOM can be pulled up from the potential VCOML to the potential VCOMH without having an increase in the power consumption at least.

Figure 31B:
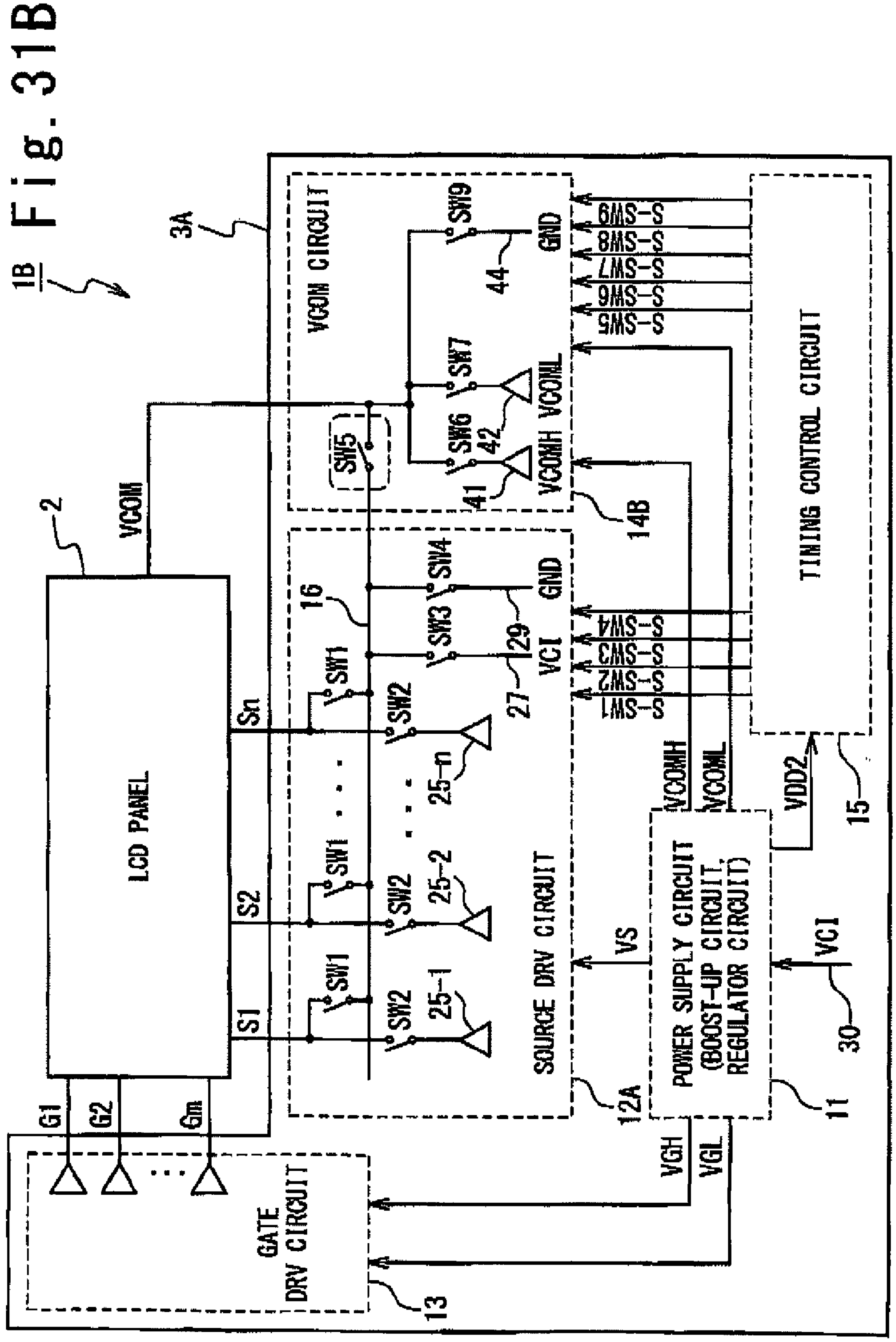
FIG. 31B is a block diagram showing another structure of the liquid crystal display device according to a fourth embodiment of the present invention.

With a present embodiment, it is also possible to employ a structure where the VCI power supply interconnection 43 and the switch SW8 are omitted from the VCOM circuit 14B of the LCD driver 3A, as shown in FIG. 31B. In the operations described above, the switches SW3 and SW5 are turned on in the period T2 where the source lines S1 to Sn and the counter electrode VCOM are connected to the VCI power supply. Thus, in the period T2, the counter electrode VCOM is connected to the VCI power supply interconnection 27 via the switches SW5 and SW3. The VCI power supply interconnection 43 and the switch SW8 are connected between the counter electrode VCOM and the VCI power supply in parallel to the switches SW3 and SW5. Therefore, the counter electrode VCOM can be connected to the VCI power supply without having the VCI power supply interconnection 43 and the switch SW8.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A driving method of a liquid crystal display panel having a source line and a counter electrode, said driving method comprising:

driving the counter electrode to a first potential;

driving the counter electrode to a second potential being different from the first potential;

setting the counter electrode and the source line to a third potential by short-circuiting the counter electrode and the source line to an interconnection having a potential between the first potential and the second potential; and driving the source line to a potential corresponding to an image data, wherein the setting of the counter electrode and the source line to the third potential occurs in a period of one frame.

2. The driving method according to claim 1, wherein the counter electrode is kept at a same potential while the source line is driven to the potential corresponding to the image data.

3. The driving method according to claim 1, wherein the source line is driven to the potential corresponding to the image data after the counter electrode is driven to the second potential.

4. The driving method according to claim 1, further comprising connecting the counter electrode to a ground potential while the source line is short-circuited to the interconnection having the potential between the first potential and the second potential.

5. The driving method according to claim 1, further comprising short-circuiting the source line to the interconnection having the potential between the first potential and the second potential, while the counter electrode is driven to the second potential.

6. The driving method according to claim 1, further comprising simultaneously performing the driving of the counter electrode to the second potential and the driving of the source electrode to the potential corresponding to the image data.

7. The driving method according to claim 1, further comprising activating a switch in order to short-circuit the counter electrode and the source line.

8. The driving method according to claim 1, wherein:

the counter electrode is driven to the first potential in a first period, the counter electrode and the source line are shorted-circuited to the interconnection having a potential between the first potential and the second potential in a second period after the first period, and the source line is shorted-circuited to the interconnection having a potential between the first potential and the second potential while the counter electrode is connected to a ground interconnection in a third period after the second period.

9. The driving method according to claim 8, wherein the counter electrode is driven to the second potential after the third period.

10. The driving method according to claim 8, wherein the source line is driven to the potential corresponding to the image data after the third period.

11. The driving method according to claim 1, wherein the second potential comprises a low level of an amplitude of a potential of the counter electrode.

12. The driving method according to claim 1, wherein the first potential comprises a high level of an amplitude of a potential of the counter electrode.

13. A driving method of a liquid crystal display panel having a source line and a counter electrode, said driving method comprising:

driving the counter electrode to a first potential;

short-circuiting, for one frame period, the counter electrode and the source line to an interconnection having a potential that is different than the first potential; and driving the source line to a potential corresponding to an image data, wherein the potential that is different than the first potential comprises a potential that is between a high level of an amplitude of a potential of the counter electrode and a low level amplitude of a potential of the counter electrode.

14. The driving method according to claim 13, wherein the counter electrode is driven to the first potential before the short-circuiting.

15. The driving method according to claim 14, wherein the source line is driven to the potential corresponding to the image data after the short-circuiting.

16. The driving method according to claim 14, further comprising driving the counter electrode to a second potential.

17. The driving method according to claim 16, wherein the counter electrode is driven to the second potential after the short circuiting and before the source line is driven to the potential corresponding to the image data.

18. The driving method according to claim 16, wherein the counter electrode is driven to the second potential at a time that is simultaneous with a time when the source line is driven to the potential corresponding to the image data.

19. The driving method according to claim 16, wherein the potential that is different than the first potential comprises a potential that is between the first potential and the second potential.

20. The driving method according to claim 13, wherein the potential that is different than the first potential is less than the first potential.

* * * * *